US009836229B2

(12) United States Patent
D'Sa et al.

(10) Patent No.: US 9,836,229 B2
(45) Date of Patent: Dec. 5, 2017

(54) N-WAY MERGE TECHNIQUE FOR UPDATING VOLUME METADATA IN A STORAGE I/O STACK

(71) Applicant: NetApp, Inc., Sunnyvale, CA (US)

(72) Inventors: Janice D'Sa, Bellevue, WA (US); Ling Zheng, Saratoga, CA (US); Blake H. Lewis, Los Altos Hills, CA (US)

(73) Assignee: NetApp, Inc., Sunnyvale, CA (US)

( * ) Notice: Subject to any disclaimer, the term of this patent is extended or adjusted under 35 U.S.C. 154(b) by 415 days.

(21) Appl. No.: 14/546,214

(22) Filed: Nov. 18, 2014

(65) Prior Publication Data
US 2016/0139838 A1 May 19, 2016

(51) Int. Cl.
G06F 3/06 (2006.01)
H04L 29/08 (2006.01)

(52) U.S. Cl.
CPC .......... *G06F 3/0619* (2013.01); *G06F 3/0607* (2013.01); *G06F 3/067* (2013.01); *G06F 3/0626* (2013.01); *G06F 3/0644* (2013.01); *G06F 3/0665* (2013.01); *G06F 3/0689* (2013.01); *H04L 67/1097* (2013.01)

(58) Field of Classification Search
CPC .... G06F 3/0689; G06F 3/0619; G06F 3/0665; G06F 3/067; G06F 3/0644; G06F 3/0607; G06F 3/0626
USPC .......................................................... 711/114
See application file for complete search history.

(56) References Cited

U.S. PATENT DOCUMENTS 5,459,857 A 10/1995 Ludlam et al.
5,511,190 A 4/1996 Sharma et al.
(Continued)

FOREIGN PATENT DOCUMENTS

EP 0726521 A2 8/1996
EP 1970821 A1 9/2008
(Continued)

OTHER PUBLICATIONS

Agrawal, et al., "Design Tradeoffs for SSD Performance," USENIX Annual Technical Conference, 2008, 14 Pages.
(Continued)

*Primary Examiner* — Jasmine Song
(74) *Attorney, Agent, or Firm* — Cesari and McKenna, LLP

(57) ABSTRACT

A N-way merge technique efficiently updates metadata in accordance with a N-way merge operation managed by a volume layer of a storage input/output (I/O) stack executing on one or more nodes of a cluster. The metadata is embodied as mappings from logical block addresses (LBAs) of a logical unit (LUN) accessible by a host to durable extent keys, and is organized as a multi-level dense tree. The mappings are organized such that a higher level of the dense tree contains more recent mappings than a next lower level, i.e., the level immediately below. The N-way merge operation is an efficient (i.e., optimized) way of updating the volume metadata mappings of the dense tree by merging the mapping content of all three levels in a single iteration, as opposed to merging the content of the first level with the content of the second level in a first iteration of a two-way merge operation and then merging the results of the first iteration with the content of the third level in a second iteration of the operation.

20 Claims, 16 Drawing Sheets

(56) References Cited

U.S. PATENT DOCUMENTS

| | | |
|---|---|---|
| 5,937,425 A | 8/1999 | Ban |
| 5,991,862 A | 11/1999 | Ruane |
| 6,219,800 B1 | 4/2001 | Johnson et al. |
| 6,257,756 B1 | 7/2001 | Zarubinsky et al. |
| 6,275,898 B1 | 8/2001 | DeKoning |
| 6,347,337 B1 | 2/2002 | Shah et al. |
| 6,434,662 B1 | 8/2002 | Greene et al. |
| 6,526,478 B1 | 2/2003 | Kirby |
| 6,560,196 B1 | 5/2003 | Wei |
| 6,578,158 B1 | 6/2003 | Deitz et al. |
| 6,604,155 B1 | 8/2003 | Chong, Jr. |
| 6,609,176 B1 | 8/2003 | Mizuno |
| 6,704,839 B2 | 3/2004 | Butterworth et al. |
| 6,741,698 B1 | 5/2004 | Jensen |
| 6,779,003 B1 | 8/2004 | Midgley et al. |
| 6,895,500 B1 | 5/2005 | Rothberg |
| 6,904,470 B1 | 6/2005 | Ofer et al. |
| 6,912,645 B2 | 6/2005 | Dorward et al. |
| 6,928,526 B1 | 8/2005 | Zhu et al. |
| 7,047,358 B2 | 5/2006 | Lee et al. |
| 7,055,058 B2 | 5/2006 | Lee et al. |
| 7,065,619 B1 | 6/2006 | Zhu et al. |
| 7,093,086 B1 | 8/2006 | van Rietschote |
| 7,110,913 B2 | 9/2006 | Monroe et al. |
| 7,174,379 B2 | 2/2007 | Agarwal et al. |
| 7,188,149 B2 | 3/2007 | Kishimoto et al. |
| 7,191,357 B2 | 3/2007 | Holland et al. |
| 7,249,150 B1 | 7/2007 | Watanabe et al. |
| 7,251,663 B1 | 7/2007 | Smith |
| 7,257,690 B1 | 8/2007 | Baird |
| 7,325,059 B2 | 1/2008 | Barach et al. |
| 7,334,094 B2 | 2/2008 | Fair |
| 7,334,095 B1 | 2/2008 | Fair et al. |
| 7,366,865 B2 | 4/2008 | Lakshmanamurthy et al. |
| 7,370,048 B2 | 5/2008 | Loeb |
| 7,373,345 B2 | 5/2008 | Carpentier et al. |
| 7,394,944 B2 | 7/2008 | Boskovic et al. |
| 7,395,352 B1 | 7/2008 | Lam et al. |
| 7,415,653 B1 | 8/2008 | Bonwick et al. |
| 7,451,167 B2 | 11/2008 | Bali et al. |
| 7,457,864 B2 | 11/2008 | Chambliss et al. |
| 7,464,125 B1 | 12/2008 | Orszag et al. |
| 7,529,780 B1 | 5/2009 | Braginsky et al. |
| 7,529,830 B2 | 5/2009 | Fujii |
| 7,543,100 B2 | 6/2009 | Singhal et al. |
| 7,543,178 B2 | 6/2009 | McNeill et al. |
| 7,562,101 B1 | 7/2009 | Jernigan et al. |
| 7,562,203 B2 | 7/2009 | Scott et al. |
| 7,603,391 B1 | 10/2009 | Federwisch et al. |
| 7,603,529 B1 | 10/2009 | MacHardy et al. |
| 7,644,087 B2 | 1/2010 | Barkai et al. |
| 7,668,885 B2 | 2/2010 | Wittke et al. |
| 7,680,837 B2 | 3/2010 | Yamato |
| 7,681,076 B1 | 3/2010 | Sarma |
| 7,701,948 B2 | 4/2010 | Rabje et al. |
| 7,743,035 B2 | 6/2010 | Chen et al. |
| 7,757,056 B1 | 7/2010 | Fair |
| 7,797,279 B1 | 9/2010 | Starling et al. |
| 7,814,064 B2 | 10/2010 | Vingralek |
| 7,818,525 B1 | 10/2010 | Frost et al. |
| 7,831,769 B1 | 11/2010 | Wen et al. |
| 7,849,098 B1 | 12/2010 | Scales et al. |
| 7,873,619 B1 | 1/2011 | Faibish et al. |
| 7,899,791 B1 | 3/2011 | Gole |
| 7,917,726 B2 | 3/2011 | Hummel et al. |
| 7,921,169 B2 | 4/2011 | Jacobs et al. |
| 7,921,325 B2 | 4/2011 | Kondo et al. |
| 7,949,693 B1 | 5/2011 | Mason et al. |
| 7,987,167 B1 | 7/2011 | Kazar et al. |
| 7,996,636 B1 | 8/2011 | Prakash et al. |
| 8,060,797 B2 | 11/2011 | Hida et al. |
| 8,074,019 B2 | 12/2011 | Gupta et al. |
| 8,078,918 B2 | 12/2011 | Diggs et al. |
| 8,082,390 B1 | 12/2011 | Fan et al. |
| 8,086,585 B1 | 12/2011 | Brashers et al. |
| 8,089,969 B2 | 1/2012 | Rabie et al. |
| 8,099,396 B1 | 1/2012 | Novick et al. |
| 8,099,554 B1 | 1/2012 | Solomon et al. |
| 8,127,182 B2 | 2/2012 | Sivaperuman et al. |
| 8,131,926 B2 | 3/2012 | Lubbers et al. |
| 8,140,821 B1 | 3/2012 | Raizen et al. |
| 8,140,860 B2 | 3/2012 | Haswell |
| 8,145,838 B1 | 3/2012 | Miller et al. |
| 8,156,016 B2 | 4/2012 | Zhang |
| 8,156,290 B1 | 4/2012 | Vanninen et al. |
| 8,156,306 B1 | 4/2012 | Raizen et al. |
| 8,184,807 B2 | 5/2012 | Kato et al. |
| 8,205,065 B2 | 6/2012 | Matze |
| 8,209,587 B1 | 6/2012 | Taylor et al. |
| 8,214,868 B2 | 7/2012 | Hamilton et al. |
| 8,224,935 B1 | 7/2012 | Bandopadhyay et al. |
| 8,244,978 B2 | 8/2012 | Kegel et al. |
| 8,250,116 B2 | 8/2012 | Mazzagatti et al. |
| 8,261,085 B1 | 9/2012 | Fernandez |
| 8,327,103 B1 | 12/2012 | Can et al. |
| 8,341,457 B2 | 12/2012 | Spry et al. |
| 8,369,217 B2 | 2/2013 | Bostica et al. |
| 8,417,987 B1 | 4/2013 | Goel et al. |
| 8,452,929 B2 | 5/2013 | Bennett |
| 8,463,825 B1 | 6/2013 | Harty et al. |
| 8,468,368 B2 | 6/2013 | Gladwin et al. |
| 8,489,811 B1 | 7/2013 | Corbett et al. |
| 8,495,417 B2 | 7/2013 | Jernigan, Iv et al. |
| 8,520,855 B1 | 8/2013 | Kohno et al. |
| 8,539,008 B2 | 9/2013 | Faith et al. |
| 8,560,879 B1 | 10/2013 | Goel |
| 8,566,617 B1 | 10/2013 | Clifford |
| 8,583,865 B1 | 11/2013 | Sade et al. |
| 8,589,625 B2 | 11/2013 | Colgrove et al. |
| 8,595,434 B2 | 11/2013 | Northcutt et al. |
| 8,595,595 B1 | 11/2013 | Grcanac et al. |
| 8,600,949 B2 | 12/2013 | Periyagaram et al. |
| 8,645,664 B1 | 2/2014 | Colgrove et al. |
| 8,645,698 B2 | 2/2014 | Yi et al. |
| 8,671,265 B2 | 3/2014 | Wright |
| 8,706,701 B1 | 4/2014 | Stefanov et al. |
| 8,732,426 B2 | 5/2014 | Colgrove et al. |
| 8,751,763 B1 | 6/2014 | Ramarao |
| 8,762,654 B1 | 6/2014 | Yang et al. |
| 8,775,868 B2 | 7/2014 | Colgrove et al. |
| 8,782,439 B2 | 7/2014 | Resch |
| 8,787,580 B2 | 7/2014 | Hodges et al. |
| 8,799,571 B1 | 8/2014 | Desroches et al. |
| 8,799,705 B2 | 8/2014 | Hallak et al. |
| 8,806,115 B1 * | 8/2014 | Patel ................ G06F 11/1471 |
| | | 711/103 |
| 8,806,160 B2 | 8/2014 | Colgrove et al. |
| 8,824,686 B1 | 9/2014 | Ishii et al. |
| 8,832,363 B1 | 9/2014 | Sundaram et al. |
| 8,832,373 B2 | 9/2014 | Colgrove et al. |
| 8,839,008 B2 | 9/2014 | Maniktala |
| 8,850,108 B1 | 9/2014 | Hayes et al. |
| 8,855,318 B1 | 10/2014 | Patnala et al. |
| 8,856,593 B2 | 10/2014 | Eckhardt et al. |
| 8,874,842 B1 | 10/2014 | Kimmel et al. |
| 8,880,787 B1 | 11/2014 | Kimmel et al. |
| 8,892,818 B1 | 11/2014 | Zheng et al. |
| 8,904,231 B2 | 12/2014 | Coatney et al. |
| 8,922,928 B2 | 12/2014 | Powell |
| 8,930,778 B2 | 1/2015 | Cohen |
| 8,943,032 B1 | 1/2015 | Xu et al. |
| 8,943,282 B1 | 1/2015 | Armangau et al. |
| 8,949,568 B2 | 2/2015 | Wei et al. |
| 8,977,781 B1 | 3/2015 | Yokoi et al. |
| 8,996,468 B1 | 3/2015 | Mattox |
| 8,996,535 B1 | 3/2015 | Kimmel et al. |
| 8,996,790 B1 | 3/2015 | Segal et al. |
| 8,996,797 B1 | 3/2015 | Zheng et al. |
| 9,003,162 B2 | 4/2015 | Lomet et al. |
| 9,009,449 B2 | 4/2015 | Chou et al. |
| 9,037,544 B1 | 5/2015 | Zheng et al. |
| 9,058,119 B1 | 6/2015 | Ray, III et al. |
| 9,092,142 B2 | 7/2015 | Nashimoto et al. |
| 9,152,684 B2 | 10/2015 | Zheng et al. |

(56) References Cited

U.S. PATENT DOCUMENTS

| | | |
|---|---|---|
| 9,195,939 B1 | 11/2015 | Goyal et al. |
| 9,229,642 B2 | 1/2016 | Shu et al. |
| 9,256,549 B2 | 2/2016 | Kimmel et al. |
| 9,268,502 B2 | 2/2016 | Zheng et al. |
| 9,274,901 B2 | 3/2016 | Veerla et al. |
| 9,298,417 B1 | 3/2016 | Muddu et al. |
| 9,367,241 B2 | 6/2016 | Sundaram et al. |
| 9,389,958 B2 | 7/2016 | Sundaram et al. |
| 9,405,783 B2 | 8/2016 | Kimmel et al. |
| 9,459,856 B2 | 10/2016 | Curzi et al. |
| 9,471,680 B2 | 10/2016 | Elsner et al. |
| 2002/0073068 A1 | 6/2002 | Guha |
| 2002/0073354 A1 | 6/2002 | Schroiff et al. |
| 2002/0091897 A1 | 7/2002 | Chiu et al. |
| 2002/0156891 A1 | 10/2002 | Ulrich et al. |
| 2002/0174419 A1 | 11/2002 | Alvarez et al. |
| 2002/0188711 A1 | 12/2002 | Meyer et al. |
| 2003/0005147 A1 | 1/2003 | Enns et al. |
| 2003/0105928 A1 | 6/2003 | Ash et al. |
| 2003/0115204 A1 | 6/2003 | Greenblatt et al. |
| 2003/0115282 A1 | 6/2003 | Rose |
| 2003/0120869 A1 | 6/2003 | Lee et al. |
| 2003/0126118 A1 | 7/2003 | Burton et al. |
| 2003/0126143 A1 | 7/2003 | Roussopoulos et al. |
| 2003/0135729 A1 | 7/2003 | Mason et al. |
| 2003/0159007 A1 | 8/2003 | Sawdon et al. |
| 2003/0163628 A1 | 8/2003 | Lin et al. |
| 2003/0172059 A1 | 9/2003 | Andrei |
| 2003/0191916 A1 | 10/2003 | McBrearty et al. |
| 2003/0195895 A1 | 10/2003 | Nowicki et al. |
| 2003/0200388 A1 | 10/2003 | Hetrick |
| 2003/0212872 A1 | 11/2003 | Patterson et al. |
| 2003/0223445 A1 | 12/2003 | Lodha |
| 2004/0003173 A1 | 1/2004 | Yao et al. |
| 2004/0052254 A1 | 3/2004 | Hooper |
| 2004/0054656 A1 | 3/2004 | Leung et al. |
| 2004/0107281 A1 | 6/2004 | Bose et al. |
| 2004/0133590 A1 | 7/2004 | Henderson et al. |
| 2004/0133622 A1 | 7/2004 | Clubb et al. |
| 2004/0133742 A1 | 7/2004 | Vasudevan et al. |
| 2004/0153544 A1 | 8/2004 | Kelliher et al. |
| 2004/0153863 A1 | 8/2004 | Klotz et al. |
| 2004/0215792 A1 | 10/2004 | Koning et al. |
| 2004/0236846 A1 | 11/2004 | Alvarez et al. |
| 2005/0027817 A1 | 2/2005 | Novik et al. |
| 2005/0043834 A1 | 2/2005 | Rotariu et al. |
| 2005/0076113 A1 | 4/2005 | Klotz et al. |
| 2005/0076115 A1 | 4/2005 | Andrews et al. |
| 2005/0091261 A1 | 4/2005 | Wu et al. |
| 2005/0128951 A1 | 6/2005 | Chawla et al. |
| 2005/0144514 A1 | 6/2005 | Ulrich et al. |
| 2005/0177770 A1 | 8/2005 | Coatney et al. |
| 2005/0203930 A1 | 9/2005 | Bukowski et al. |
| 2005/0246362 A1 | 11/2005 | Borland |
| 2005/0246398 A1 | 11/2005 | Barzilai et al. |
| 2006/0004957 A1 | 1/2006 | Hand, III |
| 2006/0071845 A1 | 4/2006 | Stroili et al. |
| 2006/0072555 A1 | 4/2006 | St. Hilaire et al. |
| 2006/0072593 A1 | 4/2006 | Grippo et al. |
| 2006/0074977 A1 | 4/2006 | Kothuri et al. |
| 2006/0129676 A1 | 6/2006 | Modi et al. |
| 2006/0136718 A1 | 6/2006 | Moreillon |
| 2006/0156059 A1 | 7/2006 | Kitamura |
| 2006/0165074 A1 | 7/2006 | Modi et al. |
| 2006/0206671 A1 | 9/2006 | Aiello et al. |
| 2006/0232826 A1 | 10/2006 | Bar-El |
| 2006/0282662 A1 | 12/2006 | Whitcomb |
| 2006/0288151 A1 | 12/2006 | McKenney |
| 2007/0033433 A1 | 2/2007 | Pecone et al. |
| 2007/0061572 A1 | 3/2007 | Imai et al. |
| 2007/0064604 A1 | 3/2007 | Chen et al. |
| 2007/0083482 A1 | 4/2007 | Rathi et al. |
| 2007/0083722 A1 | 4/2007 | Per et al. |
| 2007/0094452 A1 | 4/2007 | Fachan |
| 2007/0112723 A1 | 5/2007 | Alvarez et al. |
| 2007/0136269 A1 | 6/2007 | Yamakabe et al. |
| 2007/0143359 A1 | 6/2007 | Uppala et al. |
| 2007/0186066 A1 | 8/2007 | Desai et al. |
| 2007/0186127 A1 | 8/2007 | Desai et al. |
| 2007/0208918 A1 | 9/2007 | Harbin et al. |
| 2007/0234106 A1 | 10/2007 | Lecrone et al. |
| 2007/0245041 A1 | 10/2007 | Hua et al. |
| 2007/0266037 A1 | 11/2007 | Terry et al. |
| 2008/0065639 A1 | 3/2008 | Choudhary et al. |
| 2008/0071939 A1 | 3/2008 | Tanaka et al. |
| 2008/0104264 A1 | 5/2008 | Duerk et al. |
| 2008/0126695 A1 | 5/2008 | Berg |
| 2008/0127211 A1 | 5/2008 | Belsey et al. |
| 2008/0155190 A1 | 6/2008 | Ash et al. |
| 2008/0165899 A1 | 7/2008 | Rahman et al. |
| 2008/0201535 A1 | 8/2008 | Hara |
| 2008/0244158 A1 | 10/2008 | Funatsu et al. |
| 2008/0250270 A1 | 10/2008 | Bennett |
| 2008/0270820 A1 | 10/2008 | Kondo et al. |
| 2009/0031083 A1 | 1/2009 | Willis et al. |
| 2009/0037500 A1 | 2/2009 | Kirshenbaum |
| 2009/0037654 A1 | 2/2009 | Allison et al. |
| 2009/0083478 A1 | 3/2009 | Kunimatsu et al. |
| 2009/0097654 A1 | 4/2009 | Blake |
| 2009/0132770 A1 | 5/2009 | Lin et al. |
| 2009/0144497 A1 | 6/2009 | Withers |
| 2009/0150537 A1 | 6/2009 | Fanson |
| 2009/0157870 A1 | 6/2009 | Nakadai |
| 2009/0210611 A1 | 8/2009 | Mizushima |
| 2009/0225657 A1 | 9/2009 | Haggar et al. |
| 2009/0271412 A1 | 10/2009 | Lacapra et al. |
| 2009/0276567 A1 | 11/2009 | Burkey |
| 2009/0285476 A1 | 11/2009 | Choe et al. |
| 2009/0313503 A1 | 12/2009 | Atluri et al. |
| 2010/0011037 A1 | 1/2010 | Kazar |
| 2010/0023726 A1 | 1/2010 | Aviles |
| 2010/0030981 A1 | 2/2010 | Cook |
| 2010/0031315 A1 | 2/2010 | Feng et al. |
| 2010/0042790 A1 | 2/2010 | Mondal et al. |
| 2010/0057792 A1 | 3/2010 | Ylonen |
| 2010/0077380 A1 | 3/2010 | Baker et al. |
| 2010/0082648 A1 | 4/2010 | Potapov et al. |
| 2010/0088296 A1 | 4/2010 | Periyagaram et al. |
| 2010/0122148 A1 | 5/2010 | Flynn et al. |
| 2010/0161850 A1 | 6/2010 | Otsuka |
| 2010/0169415 A1 | 7/2010 | Leggette et al. |
| 2010/0174714 A1 | 7/2010 | Asmundsson et al. |
| 2010/0199009 A1 | 8/2010 | Koide |
| 2010/0199040 A1 | 8/2010 | Schnapp et al. |
| 2010/0205353 A1 | 8/2010 | Miyamoto et al. |
| 2010/0205390 A1 | 8/2010 | Arakawa |
| 2010/0223385 A1 | 9/2010 | Gulley et al. |
| 2010/0228795 A1 | 9/2010 | Hahn et al. |
| 2010/0228999 A1 | 9/2010 | Maheshwari et al. |
| 2010/0250497 A1 | 9/2010 | Redlich et al. |
| 2010/0250712 A1 | 9/2010 | Ellison et al. |
| 2010/0262812 A1 | 10/2010 | Lopez et al. |
| 2010/0268983 A1 | 10/2010 | Raghunandan |
| 2010/0281080 A1 | 11/2010 | Rajaram et al. |
| 2010/0293147 A1 | 11/2010 | Snow et al. |
| 2010/0306468 A1 | 12/2010 | Shionoya |
| 2011/0022778 A1 | 1/2011 | Schibilla et al. |
| 2011/0035548 A1 | 2/2011 | Kimmel et al. |
| 2011/0060876 A1 | 3/2011 | Liu |
| 2011/0066808 A1 | 3/2011 | Flynn et al. |
| 2011/0072008 A1 | 3/2011 | Mandal et al. |
| 2011/0078496 A1 | 3/2011 | Jeddeloh |
| 2011/0087929 A1 | 4/2011 | Koshiyama |
| 2011/0093674 A1 | 4/2011 | Frame et al. |
| 2011/0099342 A1 | 4/2011 | Ozdemir |
| 2011/0099419 A1 | 4/2011 | Lucas et al. |
| 2011/0126045 A1 | 5/2011 | Bennett |
| 2011/0153719 A1 | 6/2011 | Santoro et al. |
| 2011/0154103 A1 | 6/2011 | Bulusu et al. |
| 2011/0161293 A1 | 6/2011 | Vermeulen et al. |
| 2011/0161725 A1 | 6/2011 | Allen et al. |
| 2011/0191389 A1 | 8/2011 | Okamoto |
| 2011/0191522 A1 | 8/2011 | Condict et al. |
| 2011/0213928 A1 | 9/2011 | Grube et al. |

(56) References Cited

U.S. PATENT DOCUMENTS

| | | |
|---|---|---|
| 2011/0219106 A1 | 9/2011 | Wright |
| 2011/0238857 A1 | 9/2011 | Certain et al. |
| 2011/0246821 A1 | 10/2011 | Eleftheriou et al. |
| 2011/0283048 A1 | 11/2011 | Feldman et al. |
| 2011/0289565 A1 | 11/2011 | Resch et al. |
| 2011/0296133 A1 | 12/2011 | Flynn et al. |
| 2011/0307530 A1 | 12/2011 | Patterson |
| 2011/0314346 A1 | 12/2011 | Vas et al. |
| 2012/0003940 A1 | 1/2012 | Hirano et al. |
| 2012/0011176 A1 | 1/2012 | Aizman |
| 2012/0011340 A1 | 1/2012 | Flynn et al. |
| 2012/0016840 A1 | 1/2012 | Lin et al. |
| 2012/0063306 A1 | 3/2012 | Sultan et al. |
| 2012/0072656 A1 | 3/2012 | Archak et al. |
| 2012/0072680 A1 | 3/2012 | Kimura et al. |
| 2012/0078856 A1 | 3/2012 | Linde |
| 2012/0084506 A1 | 4/2012 | Colgrove et al. |
| 2012/0124282 A1 | 5/2012 | Frank et al. |
| 2012/0136834 A1 | 5/2012 | Zhao |
| 2012/0143877 A1 | 6/2012 | Kumar et al. |
| 2012/0150869 A1 | 6/2012 | Wang et al. |
| 2012/0150930 A1 | 6/2012 | Jin et al. |
| 2012/0151118 A1 | 6/2012 | Flynn et al. |
| 2012/0166715 A1 | 6/2012 | Frost et al. |
| 2012/0166749 A1 | 6/2012 | Eleftheriou et al. |
| 2012/0185437 A1 | 7/2012 | Pavlov et al. |
| 2012/0197844 A1 | 8/2012 | Wang et al. |
| 2012/0221828 A1 | 8/2012 | Fang et al. |
| 2012/0239869 A1 | 9/2012 | Chiueh et al. |
| 2012/0243687 A1 | 9/2012 | Li et al. |
| 2012/0246129 A1 | 9/2012 | Rothschild et al. |
| 2012/0246392 A1 | 9/2012 | Cheon |
| 2012/0278382 A1 | 11/2012 | Faith et al. |
| 2012/0290788 A1 | 11/2012 | Klemm et al. |
| 2012/0303876 A1 | 11/2012 | Benhase et al. |
| 2012/0310890 A1 | 12/2012 | Dodd et al. |
| 2012/0311246 A1 | 12/2012 | McWilliams et al. |
| 2012/0311290 A1 | 12/2012 | White |
| 2012/0317084 A1 | 12/2012 | Liu |
| 2012/0317338 A1 | 12/2012 | Yi et al. |
| 2012/0317353 A1 | 12/2012 | Webman et al. |
| 2012/0317395 A1 | 12/2012 | Segev et al. |
| 2012/0323860 A1 | 12/2012 | Yasa et al. |
| 2012/0324150 A1 | 12/2012 | Moshayedi et al. |
| 2013/0007097 A1 | 1/2013 | Sambe et al. |
| 2013/0010966 A1 | 1/2013 | Li et al. |
| 2013/0013654 A1 | 1/2013 | Lacapra et al. |
| 2013/0018854 A1 | 1/2013 | Condict |
| 2013/0019057 A1 | 1/2013 | Stephens |
| 2013/0042065 A1 | 2/2013 | Kasten et al. |
| 2013/0060992 A1 | 3/2013 | Cho et al. |
| 2013/0073519 A1 | 3/2013 | Lewis et al. |
| 2013/0073821 A1 | 3/2013 | Flynn et al. |
| 2013/0080679 A1 | 3/2013 | Bert |
| 2013/0086006 A1 | 4/2013 | Colgrove et al. |
| 2013/0086270 A1 | 4/2013 | Nishikawa et al. |
| 2013/0110783 A1 | 5/2013 | Wertheimer et al. |
| 2013/0110845 A1 | 5/2013 | Dua |
| 2013/0124776 A1 | 5/2013 | Hallak et al. |
| 2013/0138616 A1 | 5/2013 | Gupta et al. |
| 2013/0138862 A1 | 5/2013 | Motwani et al. |
| 2013/0166724 A1 | 6/2013 | Bairavasundaram et al. |
| 2013/0166727 A1 | 6/2013 | Wright et al. |
| 2013/0166861 A1 | 6/2013 | Takano et al. |
| 2013/0185719 A1 | 7/2013 | Kar et al. |
| 2013/0219048 A1 | 8/2013 | Arvidsson et al. |
| 2013/0226877 A1 | 8/2013 | Nagai et al. |
| 2013/0227111 A1 | 8/2013 | Wright et al. |
| 2013/0227195 A1 | 8/2013 | Beaverson et al. |
| 2013/0227201 A1 | 8/2013 | Talagala et al. |
| 2013/0227236 A1 | 8/2013 | Flynn et al. |
| 2013/0232261 A1 | 9/2013 | Wright et al. |
| 2013/0238832 A1 | 9/2013 | Dronamraju et al. |
| 2013/0238876 A1 | 9/2013 | Fiske et al. |
| 2013/0238932 A1 | 9/2013 | Resch |
| 2013/0262805 A1 | 10/2013 | Zheng et al. |
| 2013/0268497 A1 | 10/2013 | Baldwin et al. |
| 2013/0275656 A1 | 10/2013 | Talagala et al. |
| 2013/0290263 A1 | 10/2013 | Beaverson et al. |
| 2013/0305002 A1 | 11/2013 | Hallak et al. |
| 2013/0311740 A1 | 11/2013 | Watanabe et al. |
| 2013/0332688 A1 | 12/2013 | Corbett et al. |
| 2013/0346700 A1 | 12/2013 | Tomlinson, I et al. |
| 2013/0346720 A1 | 12/2013 | Colgrove et al. |
| 2013/0346810 A1 | 12/2013 | Kimmel et al. |
| 2014/0006353 A1 | 1/2014 | Chen et al. |
| 2014/0013068 A1 | 1/2014 | Yamato et al. |
| 2014/0052764 A1 | 2/2014 | Michael et al. |
| 2014/0068184 A1 | 3/2014 | Edwards et al. |
| 2014/0082255 A1 | 3/2014 | Powell |
| 2014/0082273 A1 | 3/2014 | Segev |
| 2014/0089683 A1 | 3/2014 | Miller et al. |
| 2014/0095758 A1 | 4/2014 | Smith et al. |
| 2014/0101115 A1 | 4/2014 | Ko et al. |
| 2014/0108350 A1 | 4/2014 | Marsden |
| 2014/0108797 A1 | 4/2014 | Johnson et al. |
| 2014/0149647 A1 | 5/2014 | Guo et al. |
| 2014/0172811 A1 | 6/2014 | Green |
| 2014/0181370 A1 | 6/2014 | Cohen et al. |
| 2014/0185615 A1 | 7/2014 | Ayoub et al. |
| 2014/0195480 A1 | 7/2014 | Talagala et al. |
| 2014/0195564 A1 | 7/2014 | Talagala et al. |
| 2014/0208003 A1 | 7/2014 | Cohen |
| 2014/0215129 A1 | 7/2014 | Kuzmin et al. |
| 2014/0215170 A1 | 7/2014 | Scarpino et al. |
| 2014/0244962 A1 | 8/2014 | Arges et al. |
| 2014/0258681 A1 | 9/2014 | Prasky et al. |
| 2014/0279917 A1 | 9/2014 | Minh et al. |
| 2014/0279931 A1 | 9/2014 | Gupta et al. |
| 2014/0281055 A1 | 9/2014 | Davda et al. |
| 2014/0297980 A1 | 10/2014 | Yamazaki |
| 2014/0310231 A1 | 10/2014 | Sampathkumaran et al. |
| 2014/0310373 A1 | 10/2014 | Aviles et al. |
| 2014/0325117 A1 | 10/2014 | Canepa et al. |
| 2014/0325147 A1 | 10/2014 | Nayak |
| 2014/0344222 A1 | 11/2014 | Morris et al. |
| 2014/0379965 A1 | 12/2014 | Gole et al. |
| 2015/0019792 A1 | 1/2015 | Swanson et al. |
| 2015/0032928 A1 | 1/2015 | Andrews et al. |
| 2015/0058577 A1 | 2/2015 | Earl |
| 2015/0066852 A1 | 3/2015 | Beard et al. |
| 2015/0085665 A1 | 3/2015 | Kompella et al. |
| 2015/0085695 A1 | 3/2015 | Ryckbosch et al. |
| 2015/0089138 A1 | 3/2015 | Tao et al. |
| 2015/0095555 A1 | 4/2015 | Asnaashari et al. |
| 2015/0106556 A1 | 4/2015 | Yu et al. |
| 2015/0112939 A1 | 4/2015 | Cantwell et al. |
| 2015/0120754 A1 | 4/2015 | Chase et al. |
| 2015/0127922 A1 | 5/2015 | Camp et al. |
| 2015/0134926 A1 | 5/2015 | Yang et al. |
| 2015/0143164 A1 | 5/2015 | Veerla et al. |
| 2015/0169414 A1 | 6/2015 | Lalsangi et al. |
| 2015/0172111 A1 | 6/2015 | Lalsangi et al. |
| 2015/0193338 A1 | 7/2015 | Sundaram et al. |
| 2015/0205663 A1 | 7/2015 | Sundaram et al. |
| 2015/0220402 A1 | 8/2015 | Cantwell et al. |
| 2015/0242478 A1 | 8/2015 | Cantwell et al. |
| 2015/0244795 A1 | 8/2015 | Cantwell et al. |
| 2015/0261446 A1 | 9/2015 | Lee |
| 2015/0286438 A1 | 10/2015 | Simionescu et al. |
| 2015/0324264 A1 | 11/2015 | Chinnakkonda Vidyapoornachary et al. |
| 2015/0339194 A1 | 11/2015 | Kalos et al. |
| 2015/0355985 A1 | 12/2015 | Holtz et al. |
| 2015/0378613 A1 | 12/2015 | Koseki |
| 2016/0070480 A1 | 3/2016 | Babu et al. |
| 2016/0070618 A1 | 3/2016 | Pundir et al. |
| 2016/0070644 A1 | 3/2016 | D'Sa et al. |
| 2016/0070714 A1 | 3/2016 | D'Sa et al. |
| 2016/0077744 A1 | 3/2016 | Pundir et al. |

(56) References Cited

U.S. PATENT DOCUMENTS

2016/0179410 A1   6/2016  Haas et al.
2016/0248583 A1   8/2016  McClanahan et al.

FOREIGN PATENT DOCUMENTS

| EP | 2693358 A1 | 2/2014 |
|----|-----------|--------|
| EP | 2735978 A1 | 5/2014 |
| WO | WO-2006050455 A2 | 5/2006 |
| WO | WO-2012132943 A1 | 10/2012 |

OTHER PUBLICATIONS

Alvaraez C., "NetApp Deduplication for FAS and V-Series Deployment and Implementation Guide," Technical Report TR-3505, 2011, 71 pages.
Amit et al., "Strategies for Mitigating the IOTLB Bottleneck," Technion-Israel Institute of Technology, IBM Research Haifa, WIOSCA 2010—Sixth Annual Workshop on the Interaction between Operating Systems and Computer Architecture, 2010, 12 pages.
Arpaci-Dusseau R., et al., "Log-Structured File Systems," Operating Systems: Three Easy Pieces published by Arpaci-Dusseau Books, May 25, 2014, 15 pages.
Balakrishnan M., et al., "CORFU: A Shared Log Design for Flash Clusters," Microsoft Research Silicon Vally, University of California, San Diego, Apr. 2012, https://www.usenix.org/conference/nsdi12/technical-sessions/presentation/balakrishnan, 14 pages.
Ben-Yehuda et al., "The Price of Safety: Evaluating IOMMU Performance," Proceedings of the Linux Symposium, vol. 1, Jun. 27-30, 2007, pp. 9-20.
Bitton D. et al., "Duplicate Record Elimination in Large Data Files," Oct. 26, 1999, 11 pages.
Bogaerdt, "cdeftutorial," http://oss.oetiker.ch/rrdtool/tut/cdeftutorial.en.html Date obtained from the internet, Sep. 9, 2014, 14 pages.
Bogaerdt, "Rates, Normalizing and Consolidating," http://www.vandenbogaerdl.nl/rrdtool/process.php Date obtained from the internet: Sep. 9, 2014, 5 pages.
Bogaerdt, "rrdtutorial," http://oss.oetiker.ch/rrdtool/lul/rrdtutorial.en.html Date obtained from the internet, Sep. 9, 2014, 21 pages.
Chris K., et al., "How many primes are there?" Nov. 2001. https://web.archive.org/web/20011120073053/http://primes.utm.edu/howmany.shtml.
Cornwellm., "Anatomy of a Solid-state Drive," ACM Queue-Networks, Oct. 2012, vol. 10 (10), pp. 1-7.
Culik K., et al., "Dense Multiway Trees," ACM Transactions on Database Systems, Sep. 1981, vol. 6 (3), pp. 486-512.
Debnath B., et al., "FlashStore: High Throughput Persistent Key-Value Store," Proceedings of the VLDB Endowment VLDB Endowment, Sep. 2010, vol. 3 (1-2), pp. 1414-1425.
Debnath, et al., "ChunkStash: Speeding up In line Storage Deduplication using Flash Memory," USENIX, USENIXATC '10, Jun. 2010, 15 pages.
Fan, et al., "MemC3: Compact and Concurrent MemCache with Dumber Caching and Smarter Hashing," USENIX NSDI '13, Apr. 2013, pp. 371-384.
Final Office Action dated Dec. 2, 2015, for U.S. Appl. No. 14/684,956, filed Apr. 13, 2015, 12 pages.
Final Office Action dated Dec. 22, 2015, for U.S. Appl. No. 13/857,008, filed Apr. 4, 2013, 10 pages.
Final Office Action dated Dec. 4, 2013, for U.S. Appl. No. 13/856,997, filed Apr. 4, 2013, 25 pages.
Final Office Action dated Dec. 4, 2015, for U.S. Appl. No. 14/454,197, filed Aug. 7, 2014, 11 pages.
Final Office Action dated Feb. 16, 2016, for U.S. Appl. No. 14/186,847, filed Feb. 21, 2014, 25 pages.
Final Office Action dated Feb. 2, 2016, for U.S. Appl. No. 13/856,958, filed Apr. 4, 2013, 18 pages.
Final Office Action dated Feb. 6 2014, for U.S. Appl. No. 13/856,958, filed Apr. 4, 2013, 16 pages.
Final Office Action dated Mar. 2, 2016 for U.S. Appl. No. 14/701,832, filed May 1, 2015, 16 pages.
Final Office Action dated May 13, 2013, for U.S. Appl. No. 13/041,122, filed Mar. 4, 2011, 22 pages.
Final Office Action dated Nov. 25. 2015, for U.S. Appl. No. 14/684,966, filed Apr. 13, 2015, 21 pages.
Gal E., et al., "Algorithms and Data Structures for Flash Memories," ACM Computing Surveys (CSUR) Archive, Publisher ACM, New York City, NY, USA, Jun. 2005, vol. 37 (2), pp. 138-163.
Gray J., et al., "Flash Disk Opportunity for Server Applications," Queue-Enterprise Flash Storage, Jul.-Aug. 2008, vol. 6 (4), pp. 18-23.
Gulati et al., "BASIL: Automated IO Load Balancing Across Storage Devices," Proceedings of the 8th USENIX Conference on File and Storage Technologies, FAST'10, Berkeley, CA, USA, 2010, 14 pages.
Handy J., "SSSI Tech Notes: How Controllers Maximize SSD Life," SNIA, Jan. 2013, pp. 1-20.
Hwang K., et al., "RAID-x: A New Distributed Disk Array for I/O-centric Cluster Computing," IEEE High-Performance Distributed Computing, Aug. 2000, pp. 279-286.
Intel, Product Specification—Intel® Solid-State Drive DC S3700, Jun. 2013, 32 pages.
International Search Report and Written Opinion for Application No. PCT/EP2014/071446 dated Apr. 1, 2015, 14 pages.
International Search Report and Written Opinion for Application No. PCT/US2012/071844 dated Mar. 1, 2013, 12 pages.
International Search Report and Written Opinion for Application No. PCT/US2014/035284 dated Apr. 1, 2015, 8 pages.
International Search Report and Written Opinion for Application No. PCT/US2014/055138 dated Dec. 12, 2014, 13 pages.
International Search Report and Written Opinion for Application No. PCT/US2014/058728 dated Dec. 16, 2014, 11 pages.
International Search Report and Written Opinion for Application No. PCT/US2014/060031 dated Jan. 26, 2015, 9 pages.
International Search Report and Written Opinion for Application No. PCT/US2014/071446 dated Apr. 1, 2015, 13 pages.
International Search Report and Written Opinion for Application No. PCT/US2014/071465 dated Mar. 25, 2015, 12 pages.
International Search Report and Written Opinion for Application No. PCT/US2014/071484 dated Mar. 25, 2015, 9 pages.
International Search Report and Written Opinion for Application No. PCT/US2014/071581 dated Apr. 10, 2015, 9 pages.
International Search Report and Written Opinion for Application No. PCT/US2014/071635 dated Mar. 31, 2015, 13 pages.
International Search Report and Written Opinion for Application No. PCT/US2015/016625 dated Sep. 17, 2015, 8 pages.
International Search Report and Written Opinion for Application No. PCT/US2015/021285 dated Jun. 23, 2015, 8 pages.
International Search Report and Written Opinion for Application No. PCT/US2015/024067 dated Jul. 8, 2015, 7 pages.
International Search Report and Written Opinion for Application No. PCT/US2015/048800 dated Nov. 25, 2015, 11 pages.
International Search Report and Written Opinion for Application No. PCT/US2015/048833 dated Nov. 25, 2015, 11 pages.
International Search Report and Written Opinion for Application No. PCT/US2015/056932 dated Jan. 21, 2016, 11 pages.
Lamport L., "The Part-Time Parliament," ACM Transactions on Computer Systems, May 1998, vol. 16 (2), pp. 133-169.
Leventhal A.H., "A File System All its Own," Communications of the ACM Queue, May 2013, vol. 56 (5), pp. 64-67.
Lim H., et al., "SILT: A Memory-Efficient, High-Performance Key-Value Store," Proceedings of the 23rd ACM Symposium on Operating Systems Principles (SOSP'11), Oct. 23-26, 2011, pp. 1-13.
Metreveli et al. "CPHash: A Cache-Partitioned Hash Table." Nov. 2011. https://people.csail.mit.edu/nickolai/papers/metrevelicphash-tr.pdf.
Moshayedi M., et al., "Enterprise SSDs," ACM Queue-Enterprise Flash Storage, Jul.-Aug. 2008, vol. 6 (4), pp. 32-39.

(56) References Cited

OTHER PUBLICATIONS

Non-Final Office Action dated Aug. 12, 2015, for U.S. Appl. No. 14/684,929, filed Apr. 13, 2015, 20 pages.
Non-Final Office Action dated Aug. 13, 2015, for U.S. Appl. No. 13/856,958, filed Apr. 4, 2013, 15 pages.
Non-Final Office Action dated Aug. 13, 2015, for U.S. Appl. No. 14/186,847, filed Feb. 21, 2014, 20 pages.
Non-Final Office Action dated Aug. 21, 2013, for U.S. Appl. No. 13/856,997, filed Apr. 4, 2013, 19 pages.
Non-Final Office Action dated Aug. 7, 2015, for U.S. Appl. No. 14/684,894, filed Apr. 13, 2015, 10 pages.
Non-Final Office Action dated Dec. 5, 2012, for U.S. Appl. No. 13/041,122, filed Mar. 4, 2011, 21 pages.
Non-Final Office Action dated Jan. 29, 2016, for U.S. Appl. No. 14/454,197, filed Aug. 7, 2014, 11 pages.
Non-Final Office Action dated Jul. 1, 2015, for U.S. Appl. No. 13/857,008, filed Apr. 4, 2013, 10 pages.
Non-Final Office Action dated Jul. 14, 2015, for U.S. Appl. No. 14/454,197, filed Aug. 7, 2014, 5 pages.
Non-Final Office Action dated Jul. 14, 2015, for U.S. Appl. No. 14/684,956, filed Apr. 13, 2015, 5 pages.
Non-Final Office Action dated Jul. 14, 2015, for U.S. Appl. No. 14/684,966, filed Apr. 13, 2015, 21 pages.
Non-Final Office Action dated Jul. 29, 2015, for U.S. Appl. No. 14/292,089, filed May 30, 2014, 4 pages.
Non-Final Office Action mailed Jul. 31, 2013, for U.S. Appl. No. 13/856,958, filed Apr. 4, 2013, 15 pages.
Non-Final Office Action dated Jul. 31, 2015 for U.S. Appl. No. 14/259,467, filed Apr. 23, 2014, 10 pages.
Non-Final Office Action dated Jul. 31, 2015, for U.S. Appl. No. 14/684,942, filed Apr. 13, 2015, 4 pages.
Non-Final Office Action dated Jun. 17 2013, for U.S. Appl. No. 13/041,095, filed Mar. 4, 2011, 10 pages.
Non-Final Office Action dated Jun. 30, 2015, for U.S. Appl. No. 14/057,145, filed Oct. 18, 2015, 21 pages.
Non-Final Office Action dated Mar. 31, 2016, for U.S. Appl. No. 14/941,938, filed Nov. 16, 2015, 8 pages.
Non-Final Office Action dated Oct. 19, 2015, for U.S. Appl. No. 14/701,832, filed May 1, 2015, 11 pages.
Non-Final Office Action dated Jan. 26, 2016 for U.S. Appl. No. 14/932,063, filed Nov. 4, 2015, 9 pages.
Non-Final Office Action dated Sep. 10, 2014, for U.S. Appl. No. 13/338,039, filed Dec. 27, 2011, 10 pages.
Notice Allowance dated Jan. 21, 2016, for U.S. Appl. No. 14/684,894, filed Apr. 13, 2015, 13 pages.
Notice of Allowance dated Apr. 14, 2015, for U.S. Appl. No. 13/856,997, filed Apr. 4, 2013, 18 pages.
Notice of Allowance dated Apr. 24, 2014, for U.S. Appl. No. 13/041,122, filed Mar. 4, 2011, 14 pages.
Notice of Allowance dated Aug. 24, 2016, for U.S. Appl. No. 14/684,956, filed Apr. 13, 2015, 4 pages.
Notice of Allowance dated Aug. 27, 2015 for U.S. Appl. No. 14/684,914, filed Apr. 13, 2015, 10 pages.
Notice of Allowance dated Dec. 8, 2014, for U.S. Appl. No. 13/338,039, filed Dec. 27, 2011, 7 pages.
Notice of Allowance dated Feb. 22, 2016, for U.S. Appl. No. 14/057,145, filed Oct. 18, 2015, 12 pages.
Notice of Allowance dated Mar. 29, 2016, for U.S. Appl. No. 14/454,197, filed Aug. 7, 2014, 7 pages.
Notice of Allowance dated May 4, 2016 for U.S. Appl. No. 14/932,063, filed Nov. 4, 2015, 7 pages.
Notice of Allowance dated Oct. 9, 2013, for U.S. Appl. No. 13/041,095, filed Mar. 4, 2011, 7 pages.
Oetiker, "rrdfetch," http ://oss.oetiker.ch/rrdtool/doc/rrdfetch .en. html, Date obtained from the internet: Sep. 9, 2014, 5 pages.
Oetiker, "rrdtool," http :/loss. oetiker.ch/rrdtool/doc/rrdtool.en. html Date obtained from the internet: Sep. 9, 2014, 5 pages.
Ongaro D., et al., "In Search of an Understandable Consensus Algorithm," Stanford University, URL: https://ramcloud.stanford.edu/wiki/download/attachments/11370504/raft.pdf, May 2013, 14 pages.
Ongaro, et al., "In search of an understandable consensus algorithm (extended version)," 2014, 18 pages.
Pagh R., et al., "Cuckoo Hashing," Elsevier Science, Dec. 8, 2003, pp. 1-27.
Pagh R., et al., "Cuckoo Hashing for Undergraduates," IT University of Copenhagen, Mar. 27, 2006, pp. 1-6.
Proceedings of the FAST 2002 Conference on File Storage Technologies, Monterey, California, USA, Jan. 28-30, 2002, 14 pages.
Rosenblum M., et al., "The Design and Implementation of a Log-Structured File System," In Proceedings of ACM Transactions on Computer Systems, vol. 10(1),Feb. 1992, pp. 26-52.
Rosenblum M., et al., "The Design and Implementation of a Log-Structured File System," (SUN00006867-SUN00006881), Jul. 1991, 15 pages.
Rosenblum M., et al., "The Design and Implementation of a Log-Structured File System,"Proceedings of the 13th ACM Symposium on Operating Systems Principles, (SUN00007382-SUN00007396), Jul. 1991, 15 pages.
Rosenblum M., et al., "The LFS Storage Manager," USENIX Technical Conference, Anaheim, CA, (Sun 00007397-SUN00007412), Jun. 1990, 16 pages.
Rosenblum M., et al., "The LFS Storage Manager," USENIX Technical Conference, Computer Science Division, Electrical Engin. and Computer Sciences, Anaheim, CA, presented at Summer '90 USENIX Technical Conference, (SUN00006851-SUN00006866), Jun. 1990, 16 pages.
Rosenblum M., "The Design and Implementation of a Log-Structured File System," UC Berkeley,1992, pp. 1-101.
Sears., et al., "Blsm: A General Purpose Log Structured Merge Tree," Proceedings of the 2012 ACM SIGMOD International Conference on Management, 2012, 12 pages.
Seltzer M., et al., "An Implementation of a Log Structured File System for UNIX," Winter USENIX, San Diego, CA, Jan. 25-29, 1993, pp. 1-18.
Seltzer M.I., et al., "File System Performance and Transaction Support," University of California at Berkeley Dissertation, 1992, 131 pages.
Smith K., "Garbage Collection," Sand Force, Flash Memory Summit, Santa Clara, CA, Aug. 2011, pp. 1-9.
Stoica et al. "Chord: A Scalable Peer-to-peer Lookup Service for Internet Applications." Aug. 2001. ACM. SIGCOMM '01.
Supplementary European Search Report for Application No. EP12863372 dated Jul. 16, 2015, 7 pages.
Texas Instruments, User Guide, TMS320C674x/OMAP-L1 x Processor Serial ATA (SATA) Controller, Mar. 2011, 76 Pages.
Twigg A., et al., "Stratified B-trees and Versioned Dictionaries," Proceedings of the 3rd US EN IX Conference on Hot Topics in Storage and File Systems, 2011, vol. 11, pp. 1-5.
Wikipedia, "Cuckoo hashing," http://en.wikipedia.org/wiki/Cuckoo_hash, Apr. 2013, pp. 1-5.
Wilkes J., et al., "The Hp Auto Raid Hierarchical Storage System," Operating System Review, ACM, New York, NY, Dec. 1, 1995, vol. 29 (5), pp. 96-108.
Wu P-L., et al., "A File-System-Aware FTL Design for Flash-Memory Storage Systems," IEEE, Design, Automation & Test in Europe Conference & Exhibition, 2009, pp. 1-6.
PCT Notification of Transmittal of the International Search Report and the Written Opinion of the International Searching Authority, or the Declaration, International Searching Authority, International Application No. PCT/US2015/057532, dated Feb. 9, 2016, 12 pages.
Art S. Kagel, "Two-way merge Sort", Dictionary of Algorithms and Data Structures [online], May 2005 [retrieved on Jan. 28, 2015]. Retrieved from the Internet:< URL: http://xlinux.nist.gov/dads/HTMUtwowaymrgsrt.html>, 1 page.

(56) References Cited

OTHER PUBLICATIONS

Patrick O'Neil, Edward Cheng, Dieter Gawlick, and Elizabeth O'Neil. The log-structured merge-tree (LSM-tree). Acta Informatica33. pp. 351-385, 1996.

* cited by examiner

N-WAY MERGE TECHNIQUE FOR UPDATING VOLUME METADATA IN A STORAGE I/O STACK

BACKGROUND

Technical Field

The present disclosure relates to storage systems and, more specifically, to efficiently updating metadata in a storage system.

Background Information

A plurality of storage systems may be interconnected as a cluster and configured to provide storage service relating to the organization of storage containers stored on storage devices coupled to the systems. The storage system cluster may be further configured to operate according to a client/server model of information delivery to thereby allow one or more clients (hosts) to access the storage containers, which may be embodied as files or logical units (LUNs). Each storage container may be implemented as a set of data structures, such as data blocks that store data for the storage container and metadata blocks that describe the data of the storage container. For example, the metadata may describe, e.g., identify, locations of the data on storage devices in the cluster. The storage systems may maintain the metadata describing the locations of the storage container data throughout the cluster in a data structure.

Assume an input/output (I/O) request, such as a write request having new data, is issued by a host to store data or change existing data of a storage container, such as a LUN. When processing the request, the storage system may create new metadata identifying the location of the new data and insert the new metadata into the data structure. As such, existing metadata stored in the data structure may be updated (i.e., replaced) with new metadata and stored on the storage devices. However, replacement of existing metadata with new metadata may involve many read and write operations to the storage devices, which may increase write amplification and consume processing resources of the storage system as well as impact latency of I/O request issued by the host.

BRIEF DESCRIPTION OF THE DRAWINGS

The above and further advantages of the embodiments herein may be better understood by referring to the following description in conjunction with the accompanying drawings in which like reference numerals indicate identically or functionally similar elements, of which.

OVERVIEW

Figure 1:
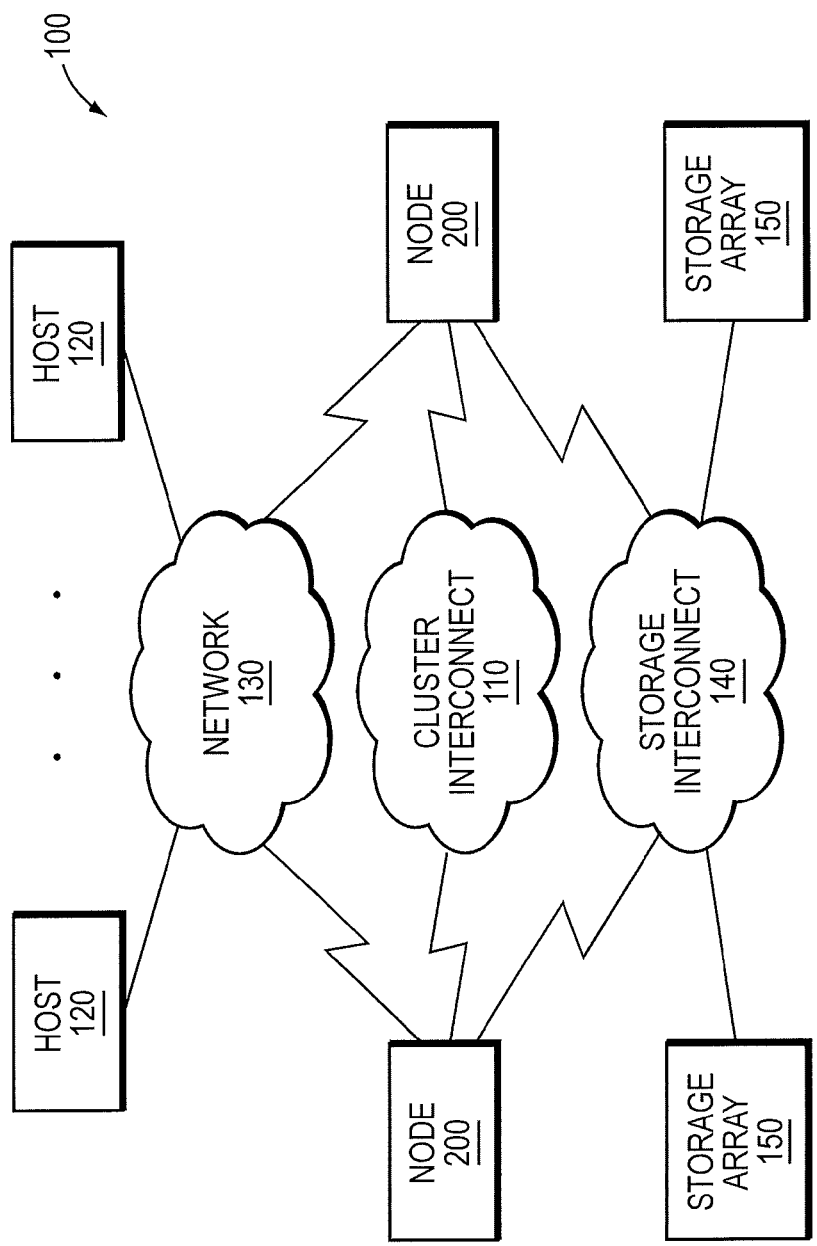
FIG. 1 is a block diagram of a plurality of nodes interconnected as a cluster.

Embodiments described herein are directed to an N-way merge technique for efficiently updating metadata in accordance with an N-way merge operation (illustratively, three-way merge operation) managed by a volume layer of a storage input/output (I/O) stack executing on one or more nodes of a cluster. The metadata is illustratively volume metadata embodied as mappings from logical block addresses (LBAs) of a logical unit (LUN) accessible by a host to durable extent keys maintained by an extent store layer of the storage I/O stack. Each extent key is a unique cluster-wide identifier associated with a storage location for an extent, which is a variable length block of data that may be aggregated from one or more write requests directed to a LBA range of the LUN. The volume metadata is illustratively organized as a multi-level dense tree metadata structure, wherein each level of the dense tree metadata structure (dense tree) includes volume metadata entries for storing the volume metadata.

In an embodiment, the volume metadata (i.e., mappings) are organized such that a higher level of the dense tree contains more recent mappings than a next lower level, i.e., the level immediately below. A top (first) level of the dense tree stores the mappings as they are generated in response to I/O (e.g., write) requests processed by the storage I/O stack. When the first level becomes full, the mapping content of the first level is sorted by ascending order of offset and merged with the sorted mapping content of a next lower (second) level. In all merge operations, the content of a higher level takes precedence over the content of a lower level because the higher level includes more recent mappings. Similarly, when the second level fills, its content is merged with the sorted mapping content of a lowest (third) level. The N-way merge operation is an efficient (i.e., optimized) way of updating the volume metadata mappings of the dense tree by merging the mapping content of N (e.g., three) adjacent levels in a single iteration, as opposed to merging the content of the first level with the content of the second level in a first iteration of a two-way merge operation and then merging the results of the first iteration with the content of the third level in a second iteration of the operation and so on in a series of two-way merge operations until N levels are merged. As such, the three-way merge technique may be employed as an N-way merge technique for dense trees having more than three levels, wherein any number, N, of adjacent levels may be merged.

Advantageously, the N-way merge technique described herein reduces the number of merge operations in the storage I/O stack by proactively merging at least three adjacent levels of the dense tree in a single iteration when the levels are nearly full, as opposed to merging two levels that yield a full level and thereafter performing another merge with a third level. As a result, the N-way merge technique enables the storage I/O stack system to maintain consistent latency of operations while reducing write amplification due to the avoidance of unnecessary write operations to the storage array.

DESCRIPTION

Storage Cluster

FIG. 1 is a block diagram of a plurality of nodes 200 interconnected as a cluster 100 and configured to provide storage service relating to the organization of information on storage devices. The nodes 200 may be interconnected by a cluster interconnect fabric 110 and include functional components that cooperate to provide a distributed storage architecture of the cluster 100, which may be deployed in a storage area network (SAN). As described herein, the components of each node 200 include hardware and software functionality that enable the node to connect to one or more hosts 120 over a computer network 130, as well as to one or more storage arrays 150 of storage devices over a storage interconnect 140, to thereby render the storage service in accordance with the distributed storage architecture.

Each host 120 may be embodied as a general-purpose computer configured to interact with any node 200 in accordance with a client/server model of information delivery. That is, the client (host) may request the services of the node, and the node may return the results of the services requested by the host, by exchanging packets over the network 130. The host may issue packets including file-based access protocols, such as the Network File System (NFS) protocol over the Transmission Control Protocol/Internet Protocol (TCP/IP), when accessing information on the node in the form of storage containers such as files and directories. However, in an embodiment, the host 120 illustratively issues packets including block-based access protocols, such as the Small Computer Systems Interface (SCSI) protocol encapsulated over TCP (iSCSI) and SCSI encapsulated over FC (FCP), when accessing information in the form of storage containers such as logical units (LUNs). Notably, any of the nodes 200 may service a request directed to a storage container on the cluster 100.

Figure 2:
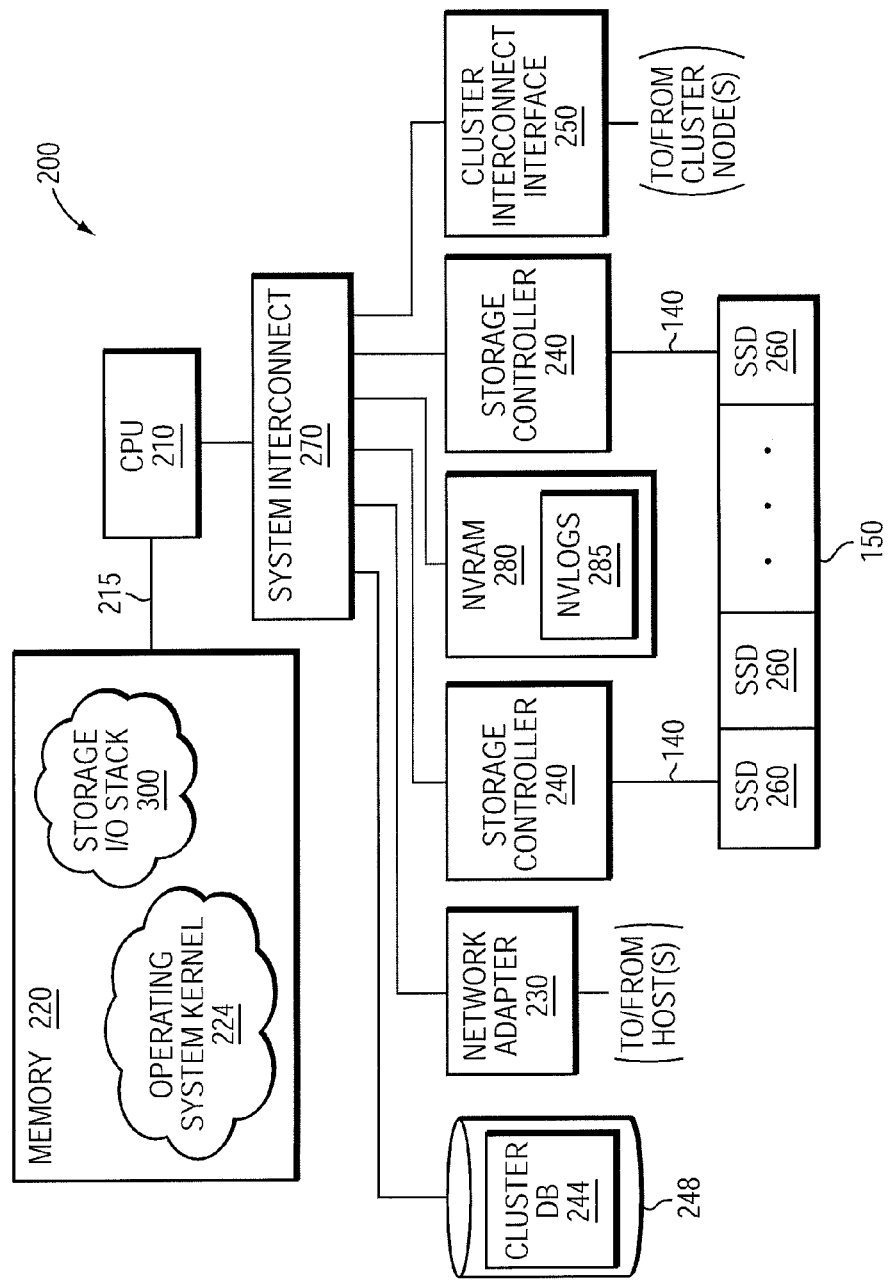
FIG. 2 is a block diagram of a node.

FIG. 2 is a block diagram of a node 200 that is illustratively embodied as a storage system having one or more central processing units (CPUs) 210 coupled to a memory 220 via a memory bus 215. The CPU 210 is also coupled to a network adapter 230, one or more storage controllers 240, a cluster interconnect interface 250 and a non-volatile random access memory (NVRAM 280) via a system interconnect 270. The network adapter 230 may include one or more ports adapted to couple the node 200 to the host(s) 120 over computer network 130, which may include point-to-point links, wide area networks, virtual private networks implemented over a public network (Internet) or a local area network. The network adapter 230 thus includes the mechanical, electrical and signaling circuitry needed to connect the node to the network 130, which illustratively embodies an Ethernet or Fibre Channel (FC) network.

The memory 220 may include memory locations that are addressable by the CPU 210 for storing software programs and data structures associated with the embodiments described herein. The CPU 210 may, in turn, include processing elements and/or logic circuitry configured to execute the software programs, such as a storage input/output (I/O) stack 300, and manipulate the data structures. Illustratively, the storage I/O stack 300 may be implemented as a set of user mode processes that may be decomposed into a plurality of threads. An operating system kernel 224, portions of which are typically resident in memory 220 (in-core) and executed by the processing elements (i.e., CPU 210), functionally organizes the node by, inter alia, invoking operations in support of the storage service implemented by the node and, in particular, the storage I/O stack 300. A suitable operating system kernel 224 may include a general-purpose operating system, such as the UNIX® series or Microsoft Windows® series of operating systems, or an operating system with configurable functionality such as microkernels and embedded kernels. However, in an embodiment described herein, the operating system kernel is illustratively the Linux® operating system. It will be apparent to those skilled in the art that other processing and memory means, including various computer readable media, may be used to store and execute program instructions pertaining to the embodiments herein.

Each storage controller 240 cooperates with the storage I/O stack 300 executing on the node 200 to access information requested by the host 120. The information is preferably stored on storage devices such as solid state drives (SSDs) 260, illustratively embodied as flash storage devices, of storage array 150. In an embodiment, the flash storage devices may be based on NAND flash components, e.g., single-layer-cell (SLC) flash, multi-layer-cell (MLC) flash or triple-layer-cell (TLC) flash, although it will be understood to those skilled in the art that other block-oriented, non-volatile, solid-state electronic devices (e.g., drives based on storage class memory components) may be advantageously used with the embodiments described herein. Accordingly, the storage devices may or may not be block-oriented (i.e., accessed as blocks). The storage controller 240 includes one or more ports having I/O interface circuitry that couples to the SSDs 260 over the storage interconnect 140, illustratively embodied as a serial attached SCSI (SAS) topology. Alternatively, other point-to-point I/O interconnect arrangements such as a conventional serial ATA (SATA) topology or a PCI topology, may be used. The system interconnect 270 may also couple the node 200 to a local service storage device 248, such as an SSD, configured to locally store cluster-related configuration information, e.g., as cluster database (DB) 244, which may be replicated to the other nodes 200 in the cluster 100.

The cluster interconnect interface 250 may include one or more ports adapted to couple the node 200 to the other node(s) of the cluster 100. In an embodiment, Ethernet may be used as the clustering protocol and interconnect fabric media, although it will be apparent to those skilled in the art that other types of protocols and interconnects, such as Infiniband, may be utilized within the embodiments described herein. The NVRAM 280 may include a back-up battery or other built-in last-state retention capability (e.g., non-volatile semiconductor memory such as storage class memory) that is capable of maintaining data in light of a failure to the node and cluster environment. Illustratively, a portion of the NVRAM 280 may be configured as one or more non-volatile logs (NVLogs 285) configured to temporarily record ("log") I/O requests, such as write requests, received from the host 120.

Storage I/O Stack

Figure 3:
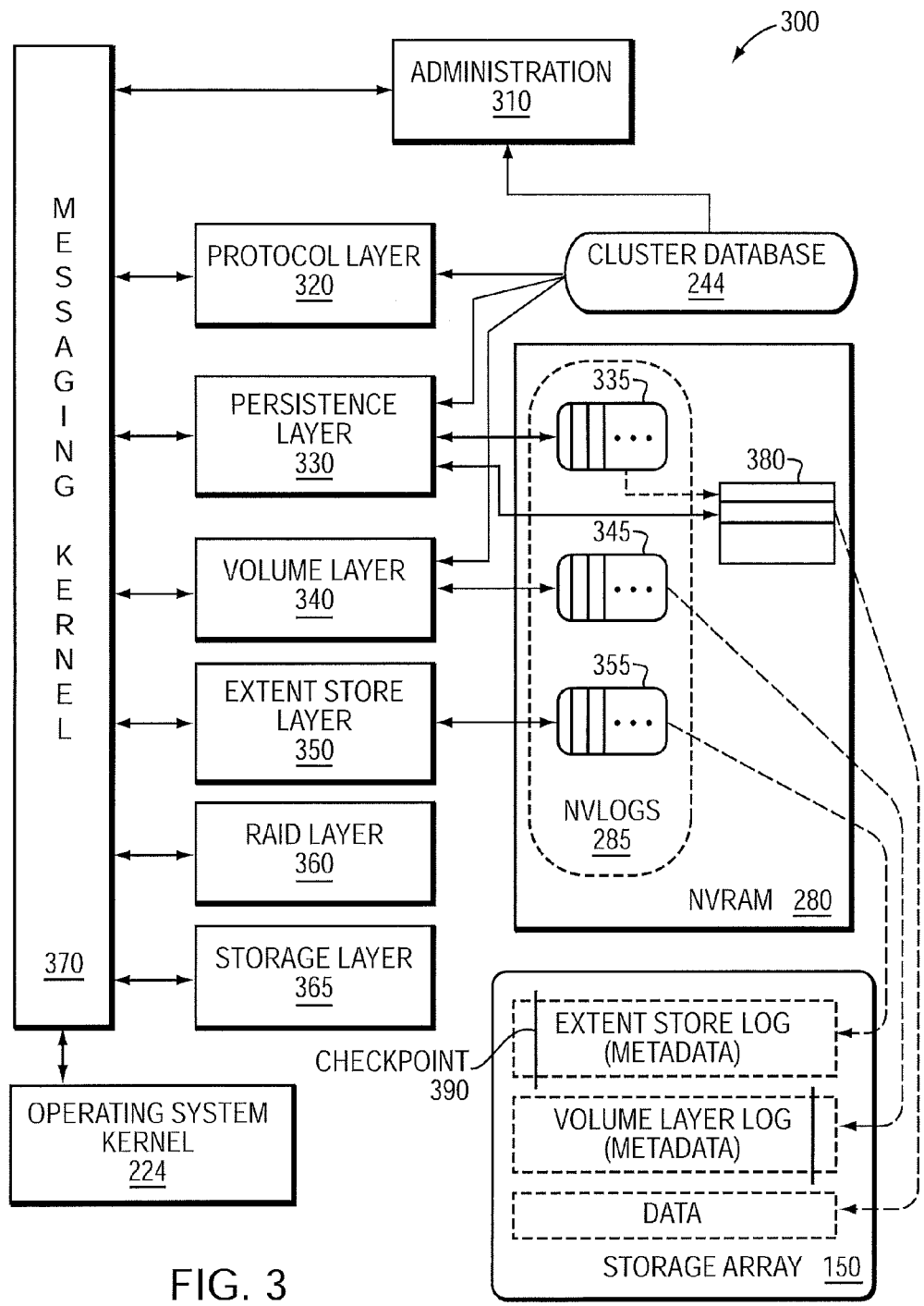
FIG. 3 is a block diagram of a storage input/output (I/O) stack of the node.

FIG. 3 is a block diagram of the storage I/O stack 300 that may be advantageously used with one or more embodiments described herein. The storage I/O stack 300 includes a plurality of software modules or layers that cooperate with other functional components of the nodes 200 to provide the distributed storage architecture of the cluster 100. In an embodiment, the distributed storage architecture presents an abstraction of a single storage container, i.e., all of the storage arrays 150 of the nodes 200 for the entire cluster 100 organized as one large pool of storage. In other words, the architecture consolidates storage, i.e., the SSDs 260 of the arrays 150, throughout the cluster (retrievable via cluster-wide keys) to enable storage of the LUNs. Both storage capacity and performance may then be subsequently scaled by adding nodes 200 to the cluster 100.

Illustratively, the storage I/O stack 300 includes an administration layer 310, a protocol layer 320, a persistence layer 330, a volume layer 340, an extent store layer 350, a Redundant Array of Independent Disks (RAID) layer 360, a storage layer 365 and a NVRAM (storing NVLogs) "layer" interconnected with a messaging kernel 370. The messaging kernel 370 may provide a message-based (or event-based) scheduling model (e.g., asynchronous scheduling) that employs messages as fundamental units of work exchanged (i.e., passed) among the layers. Suitable message-passing mechanisms provided by the messaging kernel to transfer information between the layers of the storage I/O stack 300 may include, e.g., for intra-node communication: i) messages that execute on a pool of threads, ii) messages that execute on a single thread progressing as an operation through the storage I/O stack, iii) messages using an Inter Process Communication (IPC) mechanism and, e.g., for inter-node communication: messages using a Remote Procedure Call (RPC) mechanism in accordance with a function shipping implementation. Alternatively, the I/O stack may be implemented using a thread-based or stack-based execution model. In one or more embodiments, the messaging kernel 370 allocates processing resources from the operating system kernel 224 to execute the messages. Each storage I/O stack layer may be implemented as one or more instances (i.e., processes) executing one or more threads (e.g., in kernel or user space) that process the messages passed between the layers such that the messages provide synchronization for blocking and non-blocking operation of the layers.

In an embodiment, the protocol layer 320 may communicate with the host 120 over the network 130 by exchanging discrete frames or packets configured as I/O requests according to pre-defined protocols, such as iSCSI and FCP. An I/O request, e.g., a read or write request, may be directed to a LUN and may include I/O parameters such as, inter alia, a LUN identifier (ID), a logical block address (LBA) of the LUN, a length (i.e., amount of data) and, in the case of a write request, write data. The protocol layer 320 receives the I/O request and forwards it to the persistence layer 330, which records the request into a persistent write-back cache 380, illustratively embodied as a log whose contents can be replaced randomly, e.g., under some random access replacement policy rather than only in serial fashion, and returns an acknowledgement to the host 120 via the protocol layer 320. In an embodiment only I/O requests that modify the LUN, e.g., write requests, are logged. Notably, the I/O request may be logged at the node receiving the I/O request, or in an alternative embodiment in accordance with the function shipping implementation, the I/O request may be logged at another node.

Illustratively, dedicated logs may be maintained by the various layers of the storage I/O stack 300. For example, a dedicated log 335 may be maintained by the persistence layer 330 to record the I/O parameters of an I/O request as equivalent internal, i.e., storage I/O stack, parameters, e.g., volume ID, offset, and length. In the case of a write request, the persistence layer 330 may also cooperate with the NVRAM 280 to implement the write-back cache 380 configured to store the write data associated with the write request. In an embodiment, the write-back cache 380 may be structured as a log. Notably, the write data for the write request may be physically stored in the cache 380 such that the log 335 contains the reference to the associated write data. It will be understood to persons skilled in the art the other variations of data structures may be used to store or maintain the write data in NVRAM including data structures with no logs. In an embodiment, a copy of the write-back cache may also be maintained in the memory 220 to facilitate direct memory access to the storage controllers. In other embodiments, caching may be performed at the host 120 or at a receiving node in accordance with a protocol that maintains coherency between the data stored at the cache and the cluster.

In an embodiment, the administration layer 310 may apportion the LUN into multiple volumes, each of which may be partitioned into multiple regions (e.g., allotted as disjoint block address ranges), with each region having one or more segments stored as multiple stripes on the array 150. A plurality of volumes distributed among the nodes 200 may thus service a single LUN, i.e., each volume within the LUN services a different LBA range (i.e., offset range) or set of ranges within the LUN. Accordingly, the protocol layer 320 may implement a volume mapping technique to identify a volume to which the I/O request is directed (i.e., the volume servicing the offset range indicated by the parameters of the I/O request). Illustratively, the cluster database 244 may be configured to maintain one or more associations (e.g., key-value pairs) for each of the multiple volumes, e.g., an association between the LUN ID and a volume, as well as an association between the volume and a node ID for a node managing the volume. The administration layer 310 may also cooperate with the database 244 to create (or delete) one or more volumes associated with the LUN (e.g., creating a volume ID/LUN key-value pair in the database 244). Using the LUN ID and LBA (or LBA range), the volume mapping technique may provide a volume ID (e.g., using appropriate associations in the cluster database 244) that identifies the volume and node servicing the volume destined for the request, as well as translate the LBA (or LBA range) into an offset and length within the volume. Specifically, the volume ID is used to determine a volume layer instance that manages volume metadata associated with the LBA or LBA range. As noted, the protocol layer 320 may pass the I/O request (i.e., volume ID, offset and length) to the persistence layer 330, which may use the function shipping (e.g., inter-node) implementation to forward the I/O request to the appropriate volume layer instance executing on a node in the cluster based on the volume ID.

In an embodiment, the volume layer 340 may manage the volume metadata by, e.g., maintaining states of host-visible containers, such as ranges of LUNs, and performing data management functions, such as creation of snapshots and clones, for the LUNs in cooperation with the administration layer 310. The volume metadata is illustratively embodied as in-core mappings from LUN addresses (i.e., LBAs) to durable extent keys, which are unique cluster-wide IDs associated with SSD storage locations for extents within an extent key space of the cluster-wide storage container. That is, an extent key may be used to retrieve the data of the extent at an SSD storage location associated with the extent key. Alternatively, there may be multiple storage containers in the cluster wherein each container has its own extent key space, e.g., where the administration layer 310 provides distribution of extents among the storage containers. An extent is a variable length block of data that provides a unit of storage on the SSDs and that need not be aligned on any specific boundary, i.e., it may be byte aligned. Accordingly, an extent may be an aggregation of write data from a plurality of write requests to maintain such alignment. Illustratively, the volume layer 340 may record the forwarded request (e.g., information or parameters characterizing the request), as well as changes to the volume metadata, in dedicated log 345 maintained by the volume layer 340. Subsequently, the contents of the volume layer log 345 may be written to the storage array 150 in accordance with a checkpoint (e.g., synchronization) operation that stores in-core metadata on the array 150. That is, the checkpoint operation (checkpoint) ensures that a consistent state of metadata, as processed in-core, is committed to (i.e., stored on) the storage array 150; whereas the retirement of log entries ensures that the entries accumulated in the volume layer log 345 synchronize with the metadata checkpoints committed to the storage array 150 by, e.g., retiring those accumulated log entries that are prior to the checkpoint. In one or more embodiments, the checkpoint and retirement of log entries may be data driven, periodic or both.

In an embodiment, the extent store layer 350 is responsible for storing extents prior to storage on the SSDs 260 (i.e., on the storage array 150) and for providing the extent keys to the volume layer 340 (e.g., in response to a forwarded write request). The extent store layer 350 is also responsible for retrieving data (e.g., an existing extent) using an extent key (e.g., in response to a forwarded read request). The extent store layer 350 may be responsible for performing de-duplication and compression on the extents prior to storage. The extent store layer 350 may maintain in-core mappings (e.g., embodied as hash tables) of extent keys to SSD storage locations (e.g., offset on an SSD 260 of array 150). The extent store layer 350 may also maintain a dedicated log 355 of entries that accumulate requested "put" and "delete" operations (i.e., write requests and delete requests for extents issued from other layers to the extent store layer 350), where these operations change the in-core mappings (i.e., hash table entries). Subsequently, the in-core mappings and contents of the extent store layer log 355 may be written to the storage array 150 in accordance with a "fuzzy" checkpoint 390 (i.e., checkpoint with incremental changes recorded in one or more log files) in which selected in-core mappings, less than the total, are committed to the array 150 at various intervals (e.g., driven by an amount of change to the in-core mappings, size thresholds of log 355, or periodically). Notably, the accumulated entries in log 355 may be retired once all in-core mappings have been committed to include the changes recorded in those entries prior to the first interval.

In an embodiment, the RAID layer 360 may organize the SSDs 260 within the storage array 150 as one or more RAID groups (e.g., sets of SSDs) that enhance the reliability and integrity of extent storage on the array by writing data "stripes" having redundant information, i.e., appropriate parity information with respect to the striped data, across a given number of SSDs 260 of each RAID group. The RAID layer 360 may also store a number of stripes (e.g., stripes of sufficient depth) at once, e.g., in accordance with a plurality of contiguous write operations, so as to reduce data relocation (i.e., internal flash block management) that may occur within the SSDs as a result of the operations. In an embodiment, the storage layer 365 implements storage I/O drivers that may communicate directly with hardware (e.g., the storage controllers and cluster interface) cooperating with the operating system kernel 224, such as a Linux virtual function I/O (VFIO) driver.

Write Path

Figure 4:
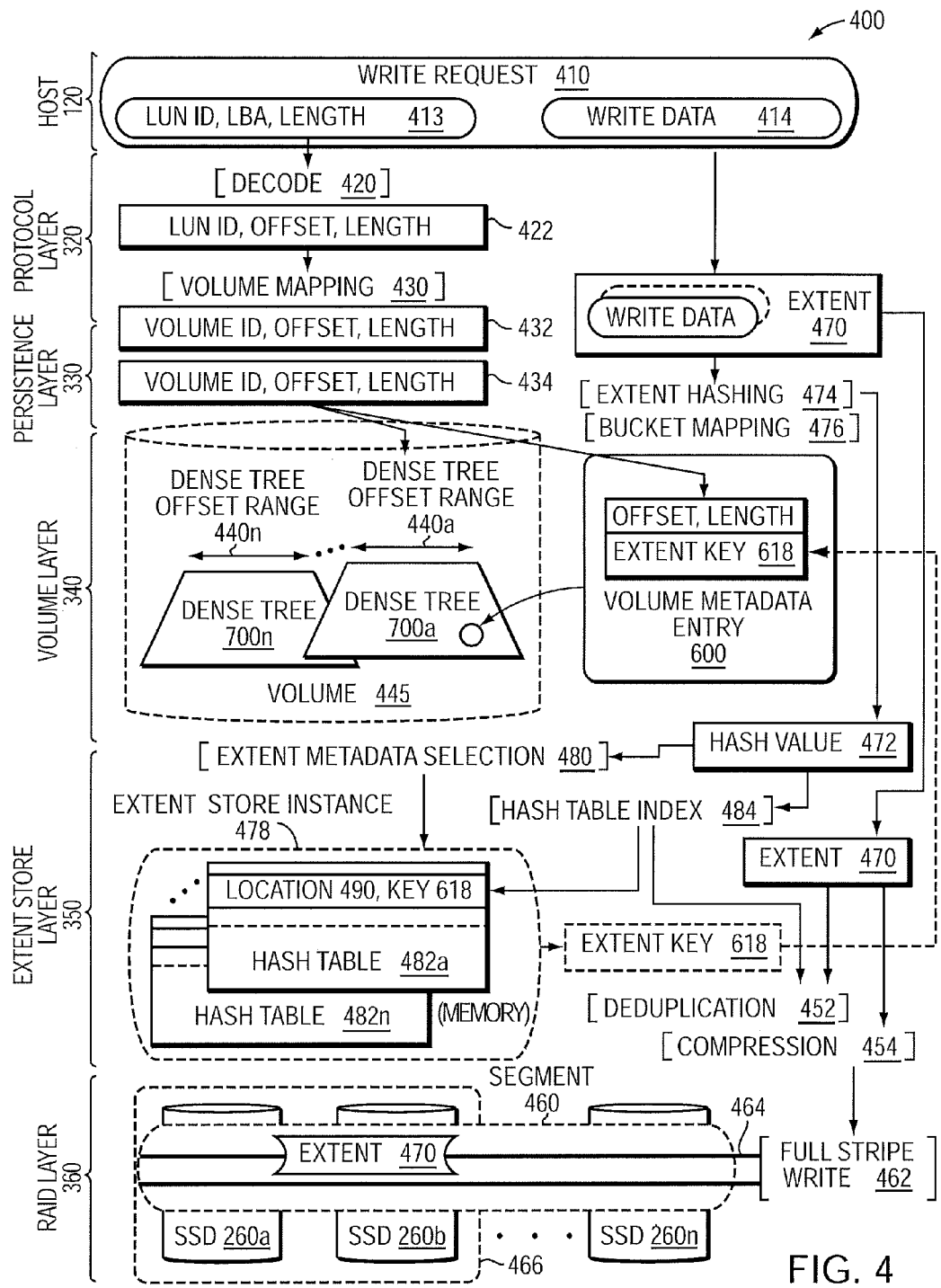
FIG. 4 illustrates a write path of the storage I/O stack.

FIG. 4 illustrates an I/O (e.g., write) path 400 of the storage I/O stack 300 for processing an I/O request, e.g., a SCSI write request 410. The write request 410 may be issued by host 120 and directed to a LUN stored on the storage array 150 of the cluster 100. Illustratively, the protocol layer 320 receives and processes the write request by decoding 420 (e.g., parsing and extracting) fields of the request, e.g., LUN ID, LBA and length (shown at 413), as well as write data 414. The protocol layer may use the results 422 from decoding 420 for a volume mapping technique 430 (described above) that translates the LUN ID and LBA range (i.e., equivalent offset and length) of the write request to an appropriate volume layer instance, i.e., volume ID (volume 445), in the cluster 100 that is responsible for managing volume metadata for the LBA range. In an alternative embodiment, the persistence layer 330 may implement the above described volume mapping technique 430. The protocol layer then passes the results 432, e.g., volume ID, offset, length (as well as write data), to the persistence layer 330, which records the request in the persistent layer log 335 and returns an acknowledgement to the host 120 via the protocol layer 320. The persistence layer 330 may aggregate and organize write data 414 from one or more write requests into a new extent 470 and perform a hash computation, i.e., a hash function, on the new extent to generate a hash value 472 in accordance with an extent hashing technique 474.

The persistent layer 330 may then pass the write request with aggregated write date including, e.g., the volume ID, offset and length, as parameters 434 of a message to the appropriate volume layer instance. In an embodiment, message passing of the parameters 434 (received by the persistent layer) may be redirected to another node via the function shipping mechanism, e.g., RPC, for inter-node communication. Alternatively, message passing of parameters 434 may be via the IPC mechanism, e.g., message threads, for intra-node communication.

In one or more embodiments, a bucket mapping technique 476 is provided that translates the hash value 472 to an instance of an appropriate extent store layer (e.g., extent store instance 478) that is responsible for storing the new extent 470. Note that the bucket mapping technique may be implemented in any layer of the storage I/O stack above the extent store layer. In an embodiment, for example, the bucket mapping technique may be implemented in the persistence layer 330, the volume layer 340, or a layer that manages cluster-wide information, such as a cluster layer (not shown). Accordingly, the persistence layer 330, the volume layer 340, or the cluster layer may contain computer executable instructions executed by the CPU 210 to perform operations that implement the bucket mapping technique 476. The persistence layer 330 may then pass the hash value 472 and the new extent 470 to the appropriate volume layer instance and onto the appropriate extent store instance via an extent store put operation. The extent hashing technique 474 may embody an approximately uniform hash function to ensure that any random extent to be written may have an approximately equal chance of falling into any extent store instance 478, i.e., hash buckets are distributed across extent store instances of the cluster 100 based on available resources. As a result, the bucket mapping technique 476 provides load-balancing of write operations (and, by symmetry, read operations) across nodes 200 of the cluster, while also leveling flash wear in the SSDs 260 of the cluster.

In response to the put operation, the extent store instance may process the hash value 472 to perform an extent metadata selection technique 480 that (i) selects an appropriate hash table 482 (e.g., hash table 482a) from a set of hash tables (illustratively in-core) within the extent store instance 478, and (ii) extracts a hash table index 484 from the hash value 472 to index into the selected hash table and lookup a table entry having an extent key 618 identifying a storage location 490 on SSD 260 for the extent. Accordingly, the extent store layer 350 contains computer executable instructions executed by the CPU 210 to perform operations that implement the extent metadata selection technique 480 described herein. If a table entry with a matching extent key is found, then the SSD location 490 mapped from the extent key 618 is used to retrieve an existing extent (not shown) from SSD. The existing extent is then compared with the new extent 470 to determine whether their data is identical. If the data is identical, the new extent 470 is already stored on SSD 260 and a de-duplication opportunity (denoted de-duplication 452) exists such that there is no need to write another copy of the data. Accordingly, a reference count (not shown) in the table entry for the existing extent is incremented and the extent key 618 of the existing extent is passed to the appropriate volume layer instance for storage within an entry (denoted as volume metadata entry 600) of a dense tree metadata structure (e.g., dense tree 700a), such that the extent key 618 is associated an offset range 440 (e.g., offset range 440a) of the volume 445.

However, if the data of the existing extent is not identical to the data of the new extent 470, a collision occurs and a deterministic algorithm is invoked to sequentially generate as many new candidate extent keys (not shown) mapping to the same bucket as needed to either provide de-duplication 452 or produce an extent key that is not already stored within the extent store instance. Notably, another hash table (e.g. hash table 482n) may be selected by a new candidate extent key in accordance with the extent metadata selection technique 480. In the event that no de-duplication opportunity exists (i.e., the extent is not already stored) the new extent 470 is compressed in accordance with compression technique 454 and passed to the RAID layer 360, which processes the new extent 470 for storage on SSD 260 within one or more stripes 464 of RAID group 466. The extent store instance may cooperate with the RAID layer 360 to identify a storage segment 460 (i.e., a portion of the storage array 150) and a location on SSD 260 within the segment 460 in which to store the new extent 470. Illustratively, the identified storage segment is a segment with a large contiguous free space having, e.g., location 490 on SSD 260b for storing the extent 470.

In an embodiment, the RAID layer 360 then writes the stripe 464 across the RAID group 466, illustratively as one or more full stripe writes 462. The RAID layer 360 may write a series of stripes 464 of sufficient depth to reduce data relocation that may occur within the flash-based SSDs 260 (i.e., flash block management). The extent store instance then (i) loads the SSD location 490 of the new extent 470 into the selected hash table 482n (i.e., as selected by the new candidate extent key), (ii) passes a new extent key (denoted as extent key 618) to the appropriate volume layer instance for storage within an entry (also denoted as volume metadata entry 600) of a dense tree 700 managed by that volume layer instance, and (iii) records a change to extent metadata of the selected hash table in the extent store layer log 355. Illustratively, the volume layer instance selects dense tree 700a spanning an offset range 440a of the volume 445 that encompasses the LBA range of the write request. As noted, the volume 445 (e.g., an offset space of the volume) is partitioned into multiple regions (e.g., allotted as disjoint offset ranges); in an embodiment, each region is represented by a dense tree 700. The volume layer instance then inserts the volume metadata entry 600 into the dense tree 700a and records a change corresponding to the volume metadata entry in the volume layer log 345. Accordingly, the I/O (write) request is sufficiently stored on SSD 260 of the cluster.

Read Path

Figure 5:
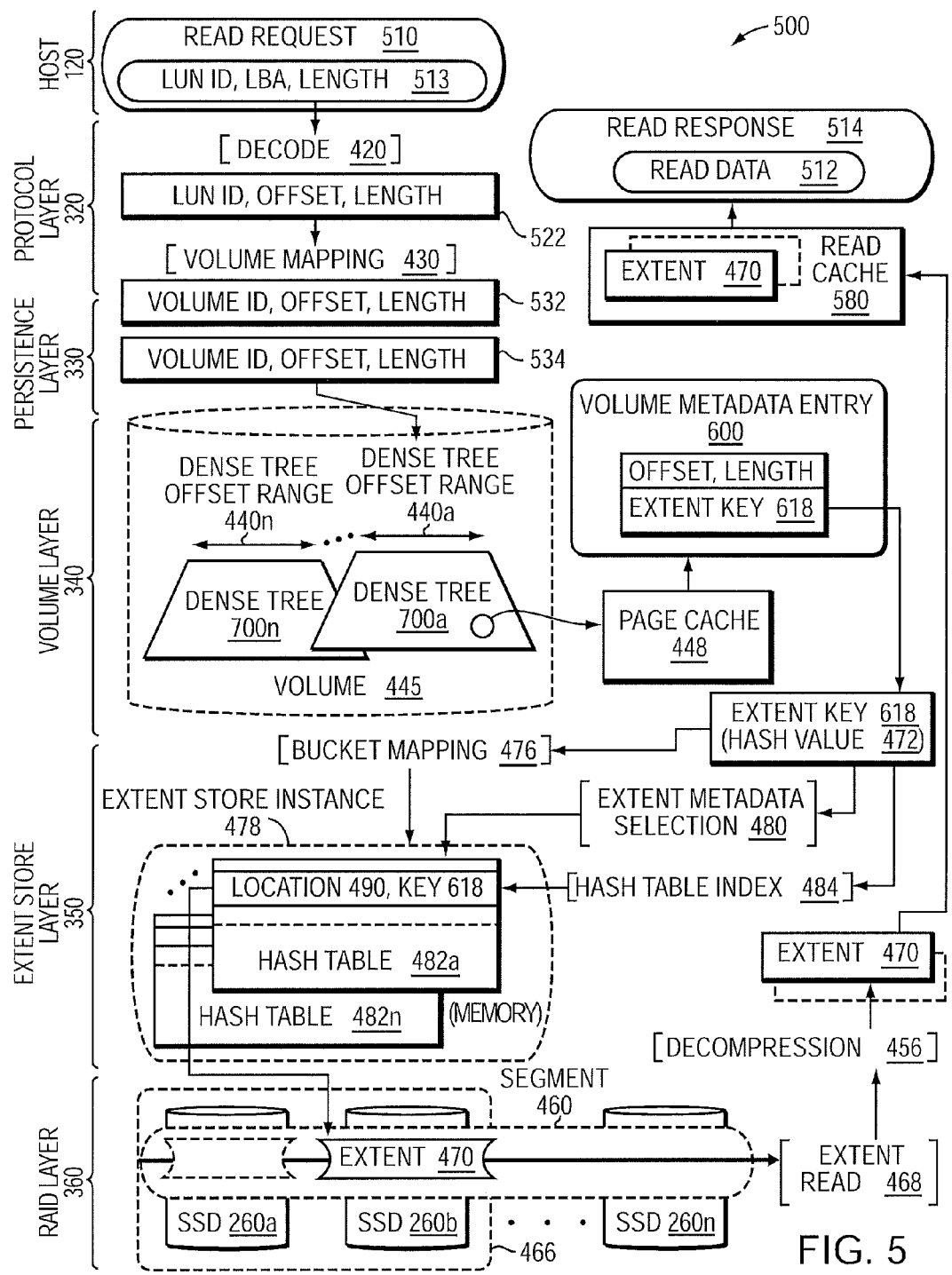
FIG. 5 illustrates a read path of the storage I/O stack.

FIG. 5 illustrates an I/O (e.g., read) path 500 of the storage I/O stack 300 for processing an I/O request, e.g., a SCSI read request 510. The read request 510 may be issued by host 120 and received at the protocol layer 320 of a node 200 in the cluster 100. Illustratively, the protocol layer 320 processes the read request by decoding 420 (e.g., parsing and extracting) fields of the request, e.g., LUN ID, LBA, and length (shown at 513), and uses the results 522, e.g., LUN ID, offset, and length, for the volume mapping technique 430. That is, the protocol layer 320 may implement the volume mapping technique 430 (described above) to translate the LUN ID and LBA range (i.e., equivalent offset and length) of the read request to an appropriate volume layer instance, i.e., volume ID (volume 445), in the cluster 100 that is responsible for managing volume metadata for the LBA (i.e., offset) range. The protocol layer then passes the results 532 to the persistence layer 330, which may search the write cache 380 to determine whether some or all of the read request can be serviced from its cached data. If the entire request cannot be serviced from the cached data, the persistence layer 330 may then pass the remaining portion of the request including, e.g., the volume ID, offset and length, as parameters 534 to the appropriate volume layer instance in accordance with the function shipping mechanism (e.g., RPC for inter-node communication) or the IPC mechanism (e.g., message threads, for intra-node communication).

The volume layer instance may process the read request to access a dense tree metadata structure (e.g., dense tree 700a) associated with a region (e.g., offset range 440a) of a volume 445 that encompasses the requested offset range (specified by parameters 534). The volume layer instance may further process the read request to search for (lookup) one or more volume metadata entries 600 of the dense tree 700a to obtain one or more extent keys 618 associated with one or more extents 470 within the requested offset range. As described further herein, each dense tree 700 may be embodied as a multiple levels of a search structure with possibly overlapping offset range entries at each level. The entries, i.e., volume metadata entries 600, provide mappings from host-accessible LUN addresses, i.e., LBAs, to durable extent keys. The various levels of the dense tree may have volume metadata entries 600 for the same offset, in which case the higher level has the newer entry and is used to service the read request. A top level of the dense tree 700 is illustratively resident in-core and a page cache 448 may be used to access lower levels of the tree. If the requested range or portion thereof is not present in the top level, a metadata page associated with an index entry at the next lower tree level is accessed. The metadata page (i.e., in the page cache 448) at the next level is then searched (e.g., a binary search) to find any overlapping entries. This process is then iterated until one or more volume metadata entries 600 of a level are found to ensure that the extent key(s) 618 for the entire requested read range are found. If no metadata entries exist for the entire or portions of the requested read range, then the missing portion(s) are zero filled.

Once found, each extent key 618 is processed by the volume layer 340 to, e.g., implement the bucket mapping technique 476 that translates the extent key to an appropriate extent store instance 478 responsible for storing the requested extent 470. Note that, in an embodiment, each extent key 618 is substantially identical to hash value 472 associated with the extent 470, i.e., the hash value as calculated during the write request for the extent, such that the bucket mapping 476 and extent metadata selection 480 techniques may be used for both write and read path operations. Note also that the extent key 618 may be derived from the hash value 472. The volume layer 340 may then pass the extent key 618 (i.e., the hash value 472 from a previous write request for the extent) to the appropriate extent store instance 478 (via an extent store get operation), which performs an extent key-to-SSD mapping to determine the location on SSD 260 for the extent.

In response to the get operation, the extent store instance may process the extent key 618 (i.e., hash value 472) to perform the extent metadata selection technique 480 that (i) selects an appropriate hash table (e.g., hash table 482*a*) from a set of hash tables within the extent store instance 478, and (ii) extracts a hash table index 484 from the extent key 618 (i.e., hash value 472) to index into the selected hash table and lookup a table entry having a matching extent key 618 that identifies a storage location 490 on SSD 260 for the extent 470. That is, the SSD location 490 mapped to the extent key 618 may be used to retrieve the existing extent (denoted as extent 470) from SSD 260 (e.g., SSD 260*b*). The extent store instance then cooperates with the RAID storage layer 360 to access the extent on SSD 260*b* and retrieve the data contents in accordance with the read request. Illustratively, the RAID layer 360 may read the extent in accordance with an extent read operation 468 and pass the extent 470 to the extent store instance. The extent store instance may then decompress the extent 470 in accordance with a decompression technique 456, although it will be understood to those skilled in the art that decompression can be performed at any layer of the storage I/O stack 300. The extent 470 may be stored in a buffer (not shown) in memory 220 and a reference to that buffer may be passed back through the layers of the storage I/O stack. The persistence layer may then load the extent into a read cache 580 (or other staging mechanism) and may extract appropriate read data 512 from the read cache 580 for the LBA range of the read request 510. Thereafter, the protocol layer 320 may create a SCSI read response 514, including the read data 512, and return the read response to the host 120.

Dense Tree Volume Metadata

As noted, a host-accessible LUN may be apportioned into multiple volumes, each of which may be partitioned into one or more regions, wherein each region is associated with a disjoint offset range, i.e., a LBA range, owned by an instance of the volume layer 340 executing on a node 200. For example, assuming a maximum volume size of 64 terabytes (TB) and a region size of 16 gigabytes (GB), a volume may have up to 4096 regions (i.e., 16 GB×4096=64 TB). In an embodiment, region 1 may be associated with an offset range of, e.g., 0-16 GB, region 2 may be associated with an offset range of 16 GB-32 GB, and so forth. Ownership of a region denotes that the volume layer instance manages metadata, i.e., volume metadata, for the region, such that I/O requests destined to an offset range within the region are directed to the owning volume layer instance. Thus, each volume layer instance manages volume metadata for, and handles I/O requests to, one or more regions. A basis for metadata scale-out in the distributed storage architecture of the cluster 100 includes partitioning of a volume into regions and distributing of region ownership across volume layer instances of the cluster.

Volume metadata, as well as data storage, in the distributed storage architecture is illustratively extent based. The volume metadata of a region that is managed by the volume layer instance is illustratively embodied as in memory (in-core) and on SSD (on-flash) volume metadata configured to provide mappings from host-accessible LUN addresses, i.e., LBAs, of the region to durable extent keys. In other words, the volume metadata maps LBA (i.e., offset) ranges of the LUN to data of the LUN (via extent keys) within the respective LBA range. In an embodiment, the volume layer organizes the volume metadata (embodied as volume metadata entries 600) as a data structure, i.e., a dense tree metadata structure (dense tree 700), which maps an offset range within the region to one or more extent keys. That is, LUN data (user data) stored as extents (accessible via extent keys) is associated with LUN offset (i.e., LBA) ranges represented as volume metadata (also stored as extents). Accordingly, the volume layer 340 contains computer executable instructions executed by the CPU 210 to perform operations that organize and manage the volume metadata entries of the dense tree metadata structure described herein.

Figure 6:
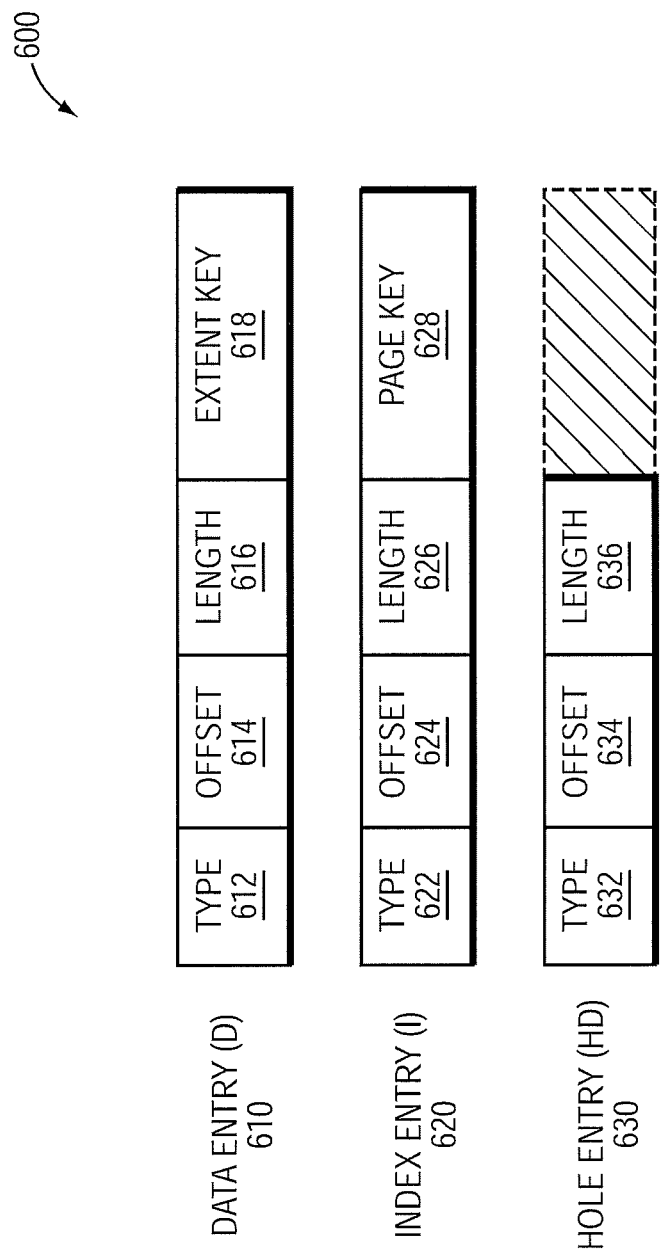
FIG. 6 is a block diagram of various volume metadata entries.

FIG. 6 is a block diagram of various volume metadata entries 600 of the dense tree metadata structure. Each volume metadata entry 600 of the dense tree 700 may be a descriptor that embodies one of a plurality of types, including a data entry (D) 610, an index entry (I) 620, and a hole entry (H) 630. The data entry (D) 610 is configured to map (offset, length) to an extent key for an extent (user data) and includes the following content: type 612, offset 614, length 616 and extent key 618. The index entry (I) 620 is configured to map (offset, length) to a page key (e.g., an extent key) of a metadata page (stored as an extent), i.e., a page containing one or more volume metadata entries, at a next lower level of the dense tree; accordingly, the index entry 620 includes the following content: type 622, offset 624, length 626 and page key 628. Illustratively, the index entry 620 manifests as a pointer from a higher level to a lower level, i.e., the index entry 620 essentially serves as linkage between the different levels of the dense tree. The hole entry (H) 630 represents absent data as a result of a hole punching operation at (offset, length) and includes the following content: type 632, offset 634, and length 636.

In an embodiment, the volume metadata entry types are of a fixed size (e.g., 12 bytes including a type field of 1 byte, an offset of 4 bytes, a length of 1 byte, and a key of 6 bytes) to facilitate search of the dense tree metadata structure as well as storage on metadata pages. Thus, some types may have unused portions, e.g., the hole entry 630 includes less information than the data entry 610 and so may have one or more unused bytes. In an alternative embodiment, the entries may be variable in size to avoid unused bytes. Advantageously, the volume metadata entries may be sized for in-core space efficiency (as well as alignment on metadata pages), which improves both read and write amplification for operations. For example, the length field (616, 626, 636) of the various volume metadata entry types may represent a unit of sector size, such as 512 bytes or 520 bytes, such that a 1 byte length may represent a range of 255×512 bytes=128K bytes.

Figure 7:
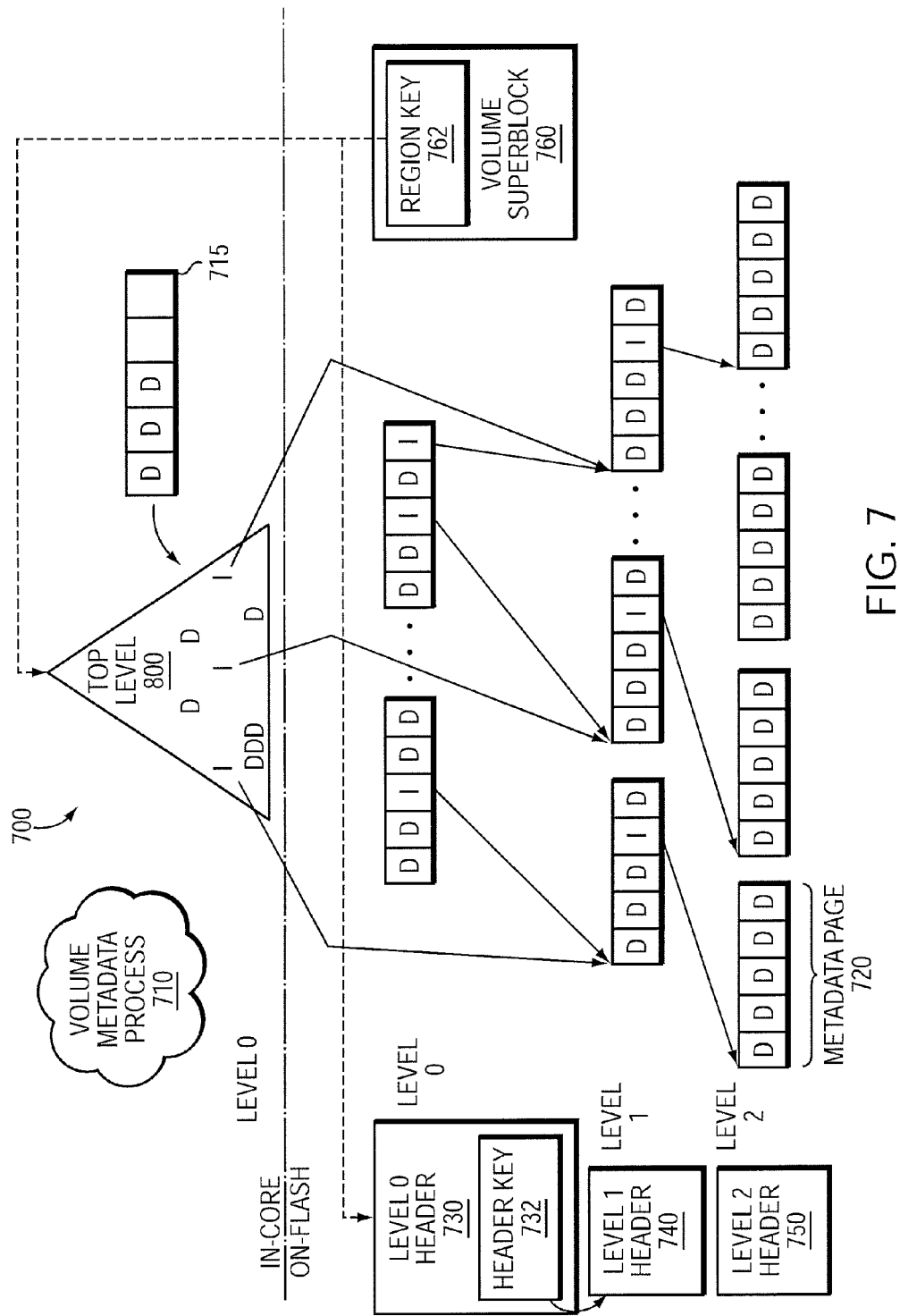
FIG. 7 is a block diagram of a dense tree metadata structure.

FIG. 7 is a block diagram of the dense tree metadata structure that may be advantageously used with one or more embodiments described herein. The dense tree metadata structure 700 is configured to provide mappings of logical offsets within a LUN (or volume) to extent keys managed by one or more extent store instances. Illustratively, the dense tree metadata structure is organized as a multi-level dense tree 700, where a top level 800 represents recent volume metadata changes and subsequent descending levels represent older changes. Specifically, a higher level of the dense tree 700 is updated first and, when that level fills, an adjacent lower level is updated, e.g., via a merge operation. A latest version of the changes may be searched starting at the top level of the dense tree and working down to the descending levels. Each level of the dense tree 700 includes fixed size records or entries, i.e., volume metadata entries 600, for storing the volume metadata. A volume metadata process 710 illustratively maintains the top level 800 of the dense tree in memory (in-core) as a balanced tree that enables indexing by offsets. The volume metadata process 710 also maintains a fixed sized (e.g., 4 KB) in-core buffer as a staging area (i.e., an in-core staging buffer 715) for volume metadata entries 600 inserted into the balanced tree (i.e., top level 800). Each level of the dense tree is further maintained on-flash as a packed array of volume metadata entries, wherein the entries are stored as extents illustratively organized as fixed sized (e.g., 4 KB) metadata pages 720. Notably, the staging buffer 715 is de-staged to SSD upon a trigger, e.g., the staging buffer is full. Each metadata page 720 has a unique identifier (ID), which guarantees that no two metadata pages can have the same content. Illustratively, metadata may not be de-duplicated by the extent store layer 350.

In an embodiment, the multi-level dense tree 700 includes three (3) levels, although it will be apparent to those skilled in the art that additional levels N of the dense tree may be included depending on parameters (e.g., size) of the dense tree configuration. Illustratively, the top level 800 of the tree is maintained in-core as level 0 and the lower levels are maintained on-flash as levels 1 and 2. In addition, copies of the volume metadata entries 600 stored in staging buffer 715 may also be maintained on-flash as, e.g., a level 0 linked list. A leaf level, e.g., level 2, of the dense tree contains data entries 610, whereas a non-leaf level, e.g., level 0 or 1, may contain both data entries 610 and index entries 620. Each index entry (I) 620 at level N of the tree is configured to point to (reference) a metadata page 720 at level N+1 of the tree. Each level of the dense tree 600 also includes a header (e.g., level 0 header 730, level 1 header 740 and level 2 header 750) that contains per level information, such as reference counts associated with the extents. Each upper level header contains a header key (an extent key for the header, e.g., header key 732 of level 0 header 730) to a corresponding lower level header. A region key 762 to a root, e.g., level 0 header 730 (and top level 800), of the dense tree 700 is illustratively stored on-flash and maintained in a volume root extent, e.g., a volume superblock 760. Notably, the volume superblock 760 contains region keys to the roots of the dense tree metadata structures for all regions in a volume.

Figure 8:
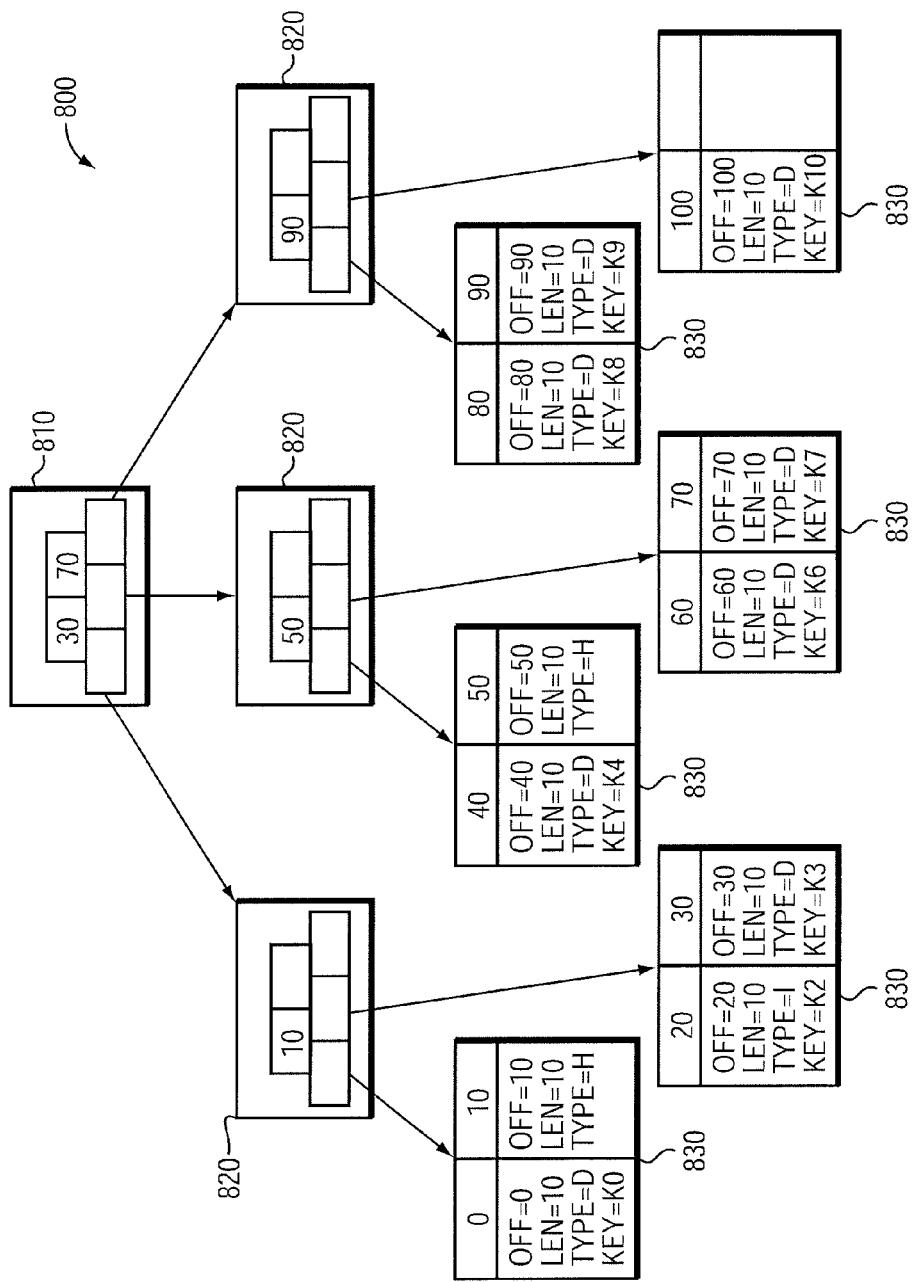
FIG. 8 is a block diagram of a top level of the dense tree metadata structure.

FIG. 8 is a block diagram of the top level 800 of the dense tree metadata structure. As noted, the top level (level 0) of the dense tree 700 is maintained in-core as a balanced tree, which is illustratively embodied as a B+ tree data structure. However, it will be apparent to those skilled in the art that other data structures, such as AVL trees, Red-Black trees, and heaps (partially sorted trees), may be advantageously used with the embodiments described herein. The B+ tree (top level 800) includes a root node 810, one or more internal nodes 820 and a plurality of leaf nodes (leaves) 830. The volume metadata stored on the tree is preferably organized in a manner that is efficient both to search, in order to service read requests and to traverse (walk) in ascending order of offset to accomplish merges to lower levels of the tree. The B+ tree has certain properties that satisfy these requirements, including storage of all data (i.e., volume metadata entries 600) in leaves 830 and storage of the leaves as sequentially accessible, e.g., as one or more linked lists. Both of these properties make sequential read requests for write data (i.e., extents) and read operations for dense tree merge more efficient. Also, since it has a much higher fan-out than a binary search tree, the illustrative B+ tree results in more efficient lookup operations. As an optimization, the leaves 30 of the B+ tree may be stored in a page cache 448, making access of data more efficient than other trees. In addition, resolution of overlapping offset entries in the B+ tree optimizes read requests of extents. Accordingly, the larger the fraction of the B+ tree (i.e., volume metadata) maintained in-core, the less loading (reading) of metadata from SSD is required so as to reduce read amplification.

Figure 9:
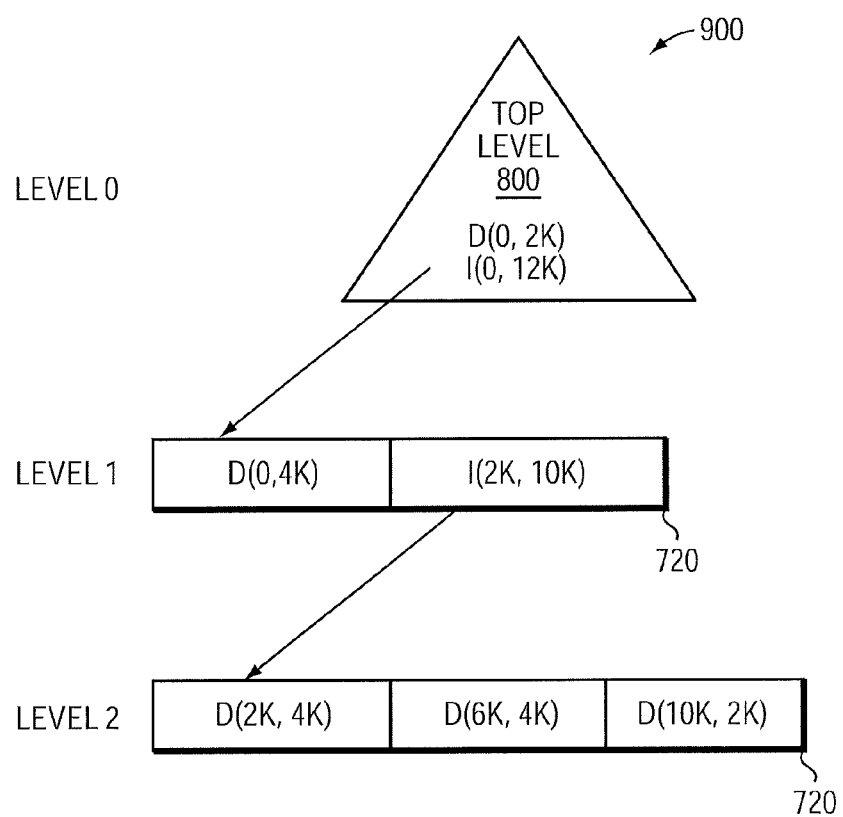
FIG. 9 illustrates mapping between levels of the dense tree metadata structure.

FIG. 9 illustrates mappings 900 between levels of the dense tree metadata structure. Each level of the dense tree 700 includes one or more metadata pages 720, each of which contains multiple volume metadata entries 600. As noted, each volume metadata entry 600 has a fixed size, e.g., 12 bytes, such that a predetermined number of entries may be packed into each metadata page 720. The data entry (D) 610 is a map of (offset, length) to an address of (user) data which is retrievable using an extent key 618 (i.e., from an extent store instance). The (offset, length) illustratively specifies an offset range of a LUN. The index entry (I) 620 is a map of (offset, length) to a page key 628 of a metadata page 720 at the next lower level. Illustratively, the offset in the index entry (I) 620 is the same as the offset of the first entry in the metadata page 720 at the next lower level. The length 626 in the index entry 620 is illustratively the cumulative length of all entries in the metadata page 720 at the next lower level (including gaps between entries).

For example, the metadata page 720 of level 1 includes an index entry "I(2K,10K)" that specifies a starting offset 2K and an ending offset 12K (i.e., 12K=2K+10K); the index entry (I) illustratively points to a metadata page 720 of level 2 covering the specified range. An aggregate view of the data entries (D) packed in the metadata page 720 of level 2 covers the mapping from the smallest offset (e.g., 2K) to the largest offset (e.g., 12K). Thus, each level of the dense tree 700 may be viewed as an overlay of an underlying level. For instance the data entry "D(0,4K)" of level 1 overlaps 2K of the underlying metadata in the page of level 2 (i.e., the range 2K,4K).

Figure 10:
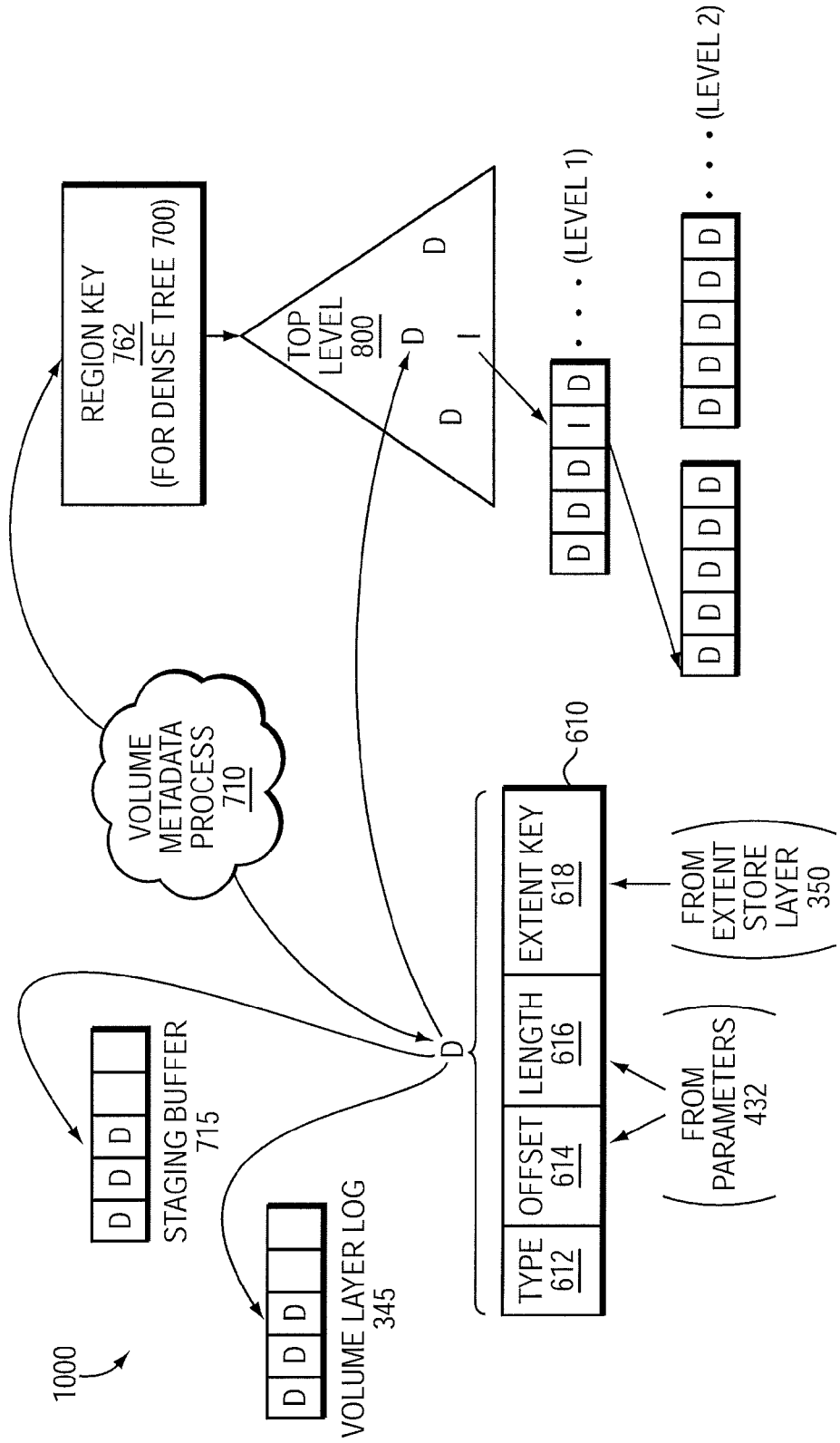
FIG. 10 illustrates a workflow for inserting a volume metadata entry into the dense tree metadata structure in accordance with a write request.

In one or more embodiments, operations for volume metadata managed by the volume layer 340 include insertion of volume metadata entries, such as data entries 610, into the dense tree 700 for write requests. As noted, each dense tree 700 may be embodied as multiple levels of a search structure with possibly overlapping offset range entries at each level, wherein each level is a packed array of entries (e.g., sorted by offset) and where leaf entries have an offset range (offset, length) an extent key. FIG. 10 illustrates a workflow 1000 for inserting a volume metadata entry into the dense tree metadata structure in accordance with a write request. In an embodiment, volume metadata updates (changes) to the dense tree 700 occur first at the top level of the tree, such that a complete, top-level description of the changes is maintained in memory 220.

Operationally, the volume metadata process 710 applies the region key 762 to access the dense tree 700 (i.e., top level 800) of an appropriate region (e.g., offset range 440 as determined from the parameters 432 derived from a write request 410). Upon completion of a write request, the volume metadata process 710 creates a volume metadata entry, e.g., a new data entry 610, to record a mapping of offset/length-to-extent key (i.e., offset range-to-user data). Illustratively, the new data entry 610 includes an extent key 618 (i.e., from the extent store layer 350) associated with data (i.e., extent 470) of the write request 410, as well as offset 614 and length 616 (i.e., from the write parameters 432) and type 612 (i.e., data entry D). The volume metadata process 710 then updates the volume metadata by inserting (adding) the data entry D into the level 0 staging buffer 715, as well as into the top level 800 of dense tree 700 and the volume layer log 345, thereby signifying that the write request is stored on the storage array 150.

Dense Tree Volume Metadata Checkpointing

When a level of the dense tree 700 is full, volume metadata entries 600 of the level are merged with the next lower level of the dense tree. As part of the merge, new index entries 620 are created in the level to point to new lower level metadata pages 720, i.e., data entries from the level are merged (and pushed) to the lower level so that they may be "replaced" with an index reference in the level. The top level 800 (i.e., level 0) of the dense tree 700 is illustratively maintained in-core such that a merge operation to level 1 facilitates a checkpoint to SSD 260. The lower levels (i.e., levels 1 and/or 2) of the dense tree are illustratively maintained on-flash and updated (e.g., merged) as a batch operation (i.e., processing the entries of one level with those of a lower level) when the higher levels are full. The merge operation illustratively includes a sort, e.g., a 2-way merge sort operation. A parameter of the dense tree 700 is the ratio K of the size of level N−1 to the size of level N. Illustratively, the size of the array at level N is K times larger than the size of the array at level N−1, i.e., sizeof(level N)=K*sizeof(level N−1). After K merges from level N−1, level N becomes full (i.e., all entries from a new, fully-populated level N−1 are merged with level N, iterated K times.)

Figure 11:
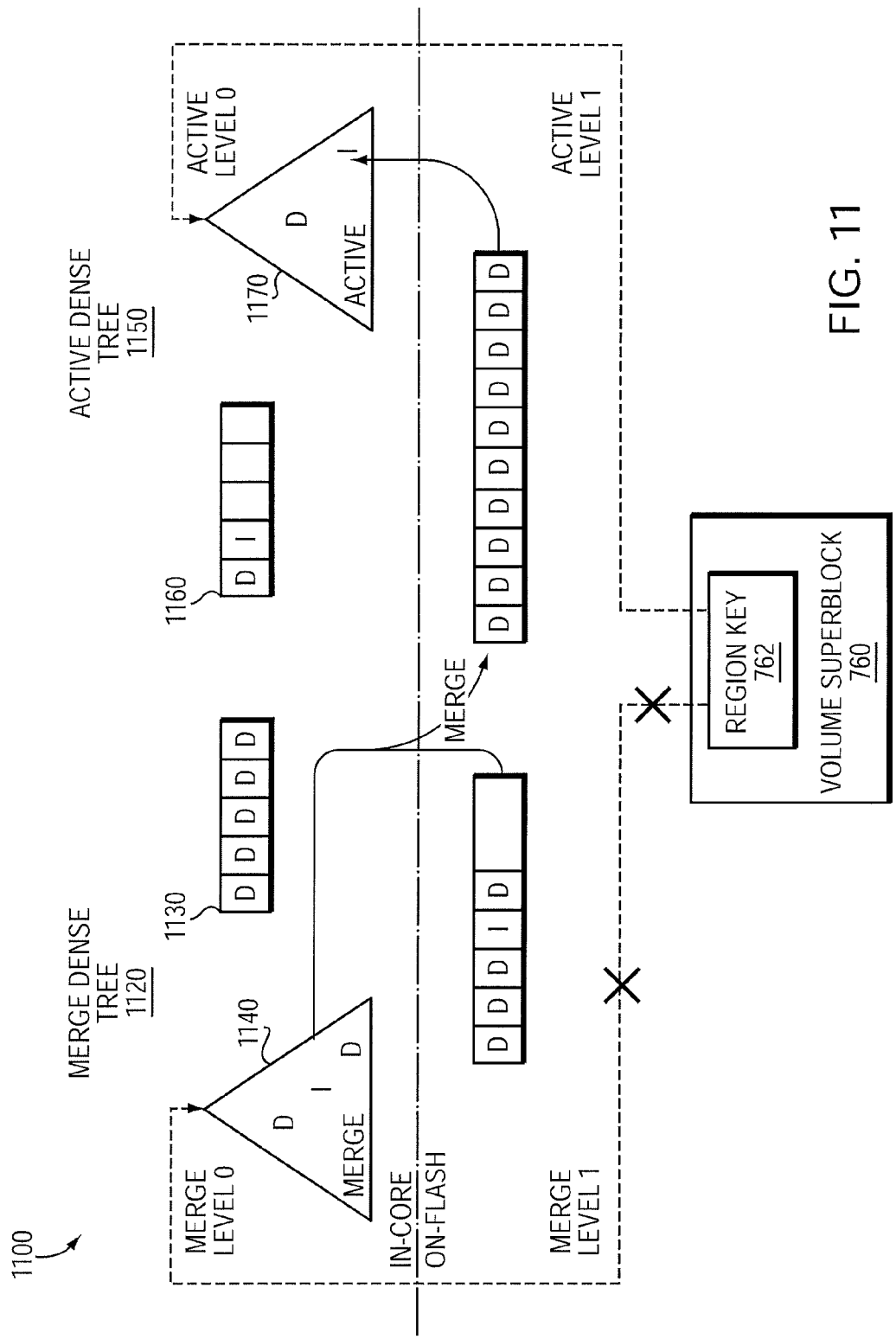
FIG. 11 illustrates merging between levels of the dense tree metadata structure.

FIG. 11 illustrates merging 1100 between levels, e.g., levels 0 and 1, of the dense tree metadata structure. In an embodiment, a merge operation is triggered when level 0 is full. When performing the merge operation, the dense tree metadata structure transitions to a "merge" dense tree structure (shown at 1120) that merges, while an alternate "active" dense tree structure (shown at 1150) is utilized to accept incoming data. Accordingly, two in-core level 0 staging buffers 1130, 1160 are illustratively maintained for concurrent merge and active (write) operations, respectively. In other words, an active staging buffer 1160 and active top level 1170 of active dense tree 1150 handle in-progress data flow (i.e., active user read and write requests), while a merge staging buffer 1130 and merge top level 1140 of merge dense tree 1120 handle consistency of the data during a merge operation. That is, a "double buffer" arrangement may be used to handle the merge of data (i.e., entries in the level 0 of the dense tree) while processing active operations.

During the merge operation, the merge staging buffer 1130, as well as the top level 1140 and lower level array (e.g., merge level 1) are read-only and are not modified. The active staging buffer 1160 is configured to accept the incoming (user) data, i.e., the volume metadata entries received from new put operations are loaded into the active staging buffer 1160 and added to the top level 1170 of the active dense tree 1150. Illustratively, merging from level 0 to level 1 within the merge dense tree 1120 results in creation of a new active level 1 for the active dense tree 1150, i.e., the resulting merged level 1 from the merge dense tree is inserted as a new level 1 into the active dense tree. A new index entry I is computed to reference the new active level 1 and the new index entry I is loaded into the active staging buffer 1160 (as well as in the active top level 1170). Upon completion of the merge, the region key 762 of volume superblock 760 is updated to reference (point to) the root, e.g., active top level 1170 and active level 0 header (not shown), of the active dense tree 1150, thereby deleting (i.e., rendering inactive) merge level 0 and merge level 1 of the merge dense tree 1120. The merge staging buffer 1130 (and the top level 1140 of the dense tree) thus becomes an empty inactive buffer until the next merge. The merge data structures (i.e., the merge dense tree 1120 including staging buffer 1130) may be maintained in-core and "swapped" as the active data structures at the next merge (i.e., "double buffered").

Figure 12:
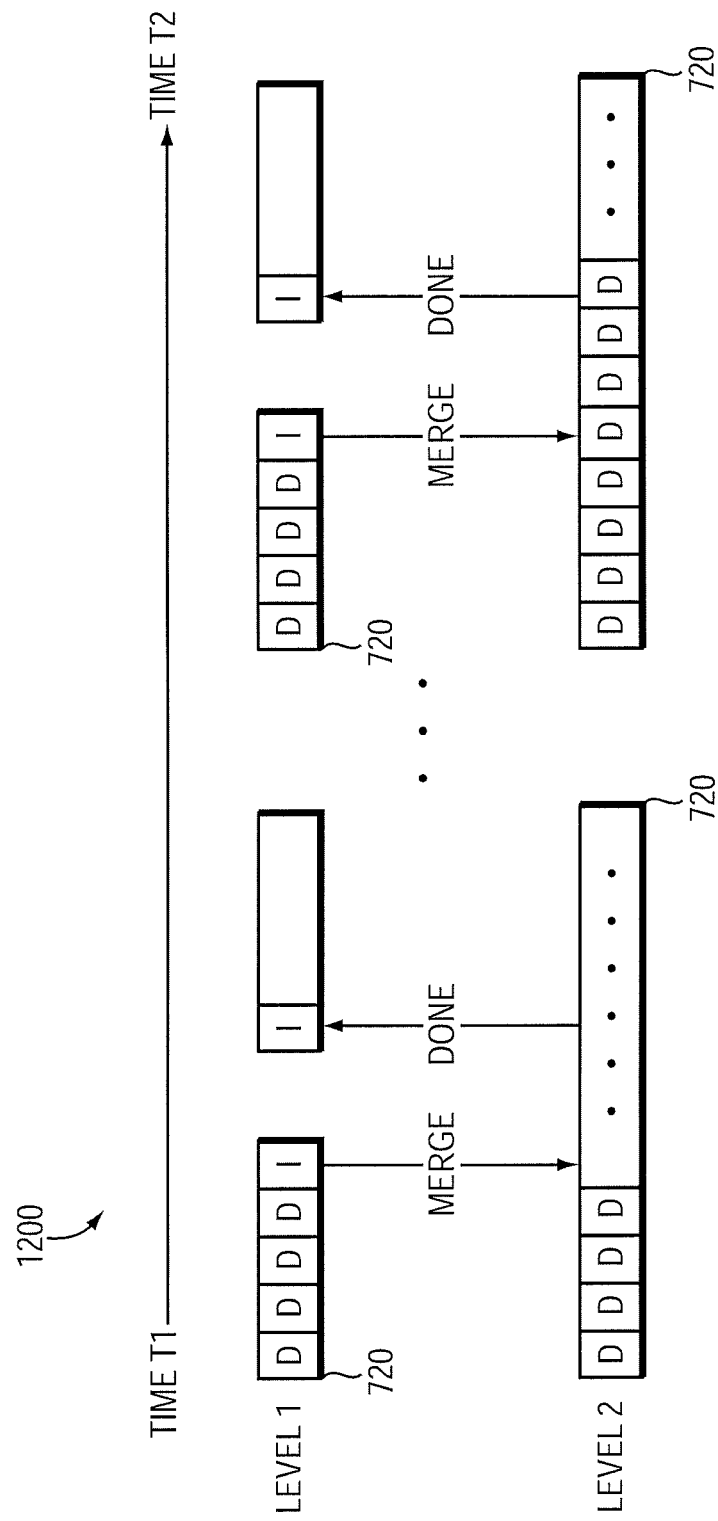
FIG. 12 illustrates batch updating between levels of the dense tree metadata structure.

FIG. 12 illustrates batch updating 1200 between lower levels, e.g., levels 1 and 2, of the dense tree metadata structure. Illustratively, as an example, a metadata page 720 of level 1 includes four data entries D and an index entry I referencing a metadata page 720 of level 2. When full, level 1 batch updates (merges) to level 2, thus emptying the data entries D of level 1, i.e., contiguous data entries are combined (merged) and pushed to the next lower level with a reference inserted in their place in the level. The merge of changes of layer 1 into layer 2 illustratively produces a new set of extents on SSD, i.e., new metadata pages are also stored, illustratively, in an extent store instance. As noted, level 2 is illustratively several times larger, e.g., K times larger, than level 1 so that it can support multiple merges. Each time a merge is performed, some older entries that were previously on SSD may be deleted. Advantageously, use of the multi-level tree structure lowers the overall frequency of volume metadata that is rewritten (and hence reduces write amplification), because old metadata may be maintained on a level while new metadata is accumulated in that level until it is full. Further, when a plurality of upper levels become full, a multi-way merge to a lower level may be performed (e.g., a three-way merge from full levels 0 and 1 to level 2).

Figure 13:
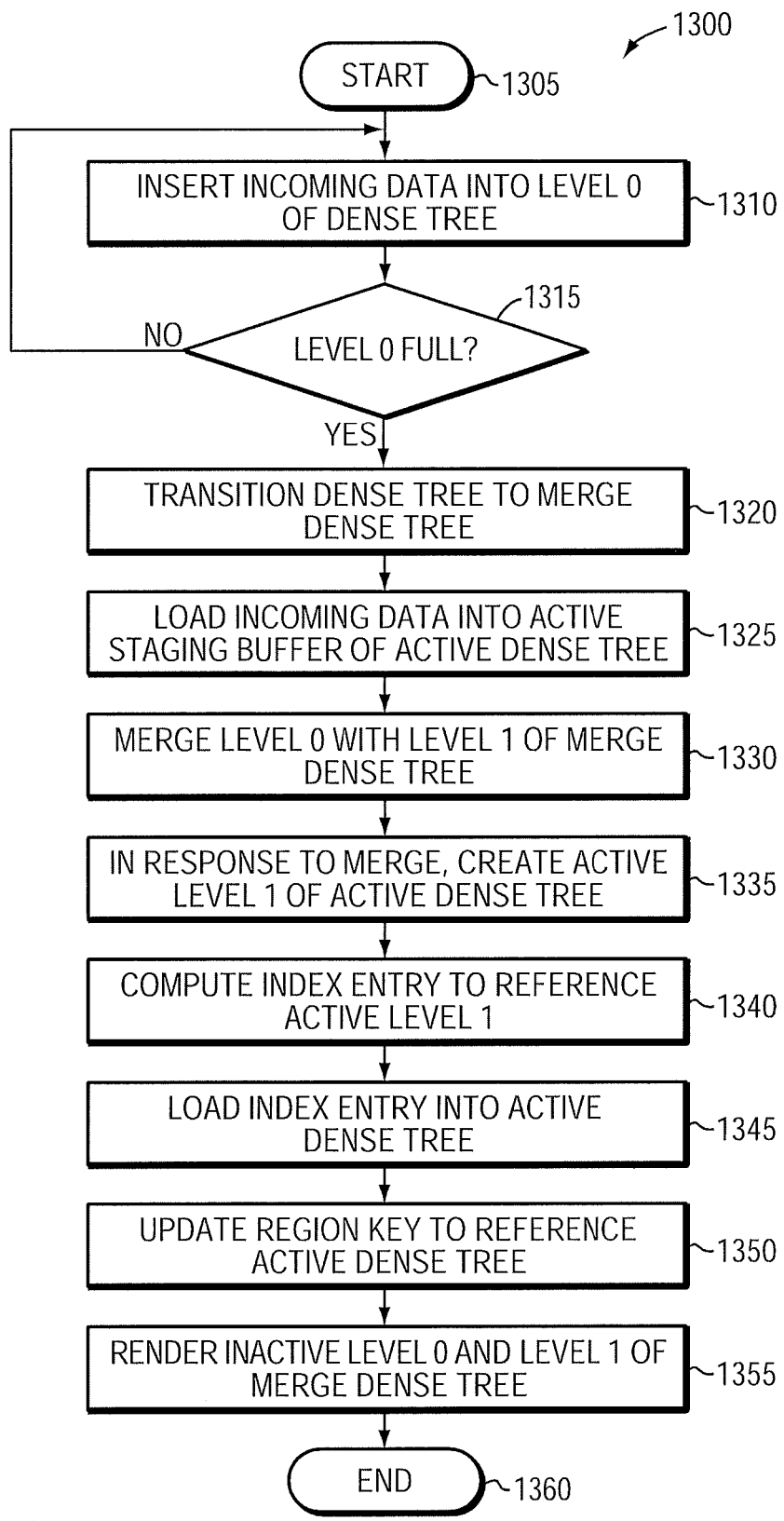
FIG. 13 is an example simplified procedure for merging between levels of the dense tree metadata structure.

FIG. 13 is an example simplified procedure 1300 for merging between levels of the dense tree metadata structure. The procedure starts at step 1305 and proceeds to step 1310 where incoming data received at the dense tree metadata structure is inserted into level 0, i.e., top level 800, of the dense tree. Note that the incoming data is inserted into the top level 800 as a volume metadata entry. At step 1315, a determination is made as whether level 0, i.e., top level 800, of the dense tree is rendered full. If not, the procedure returns to step 1310; otherwise, if the level 0 is full, the dense tree transitions to a merge dense tree structure at step 1320. At step 1325, incoming data is loaded into an active staging buffer of an active dense tree structure and, at step 1330, the level 0 merges with level 1 of the merge dense tree structure. In response to the merge, a new active level 1 is created for the active dense tree structure at step 1335. At step 1340, an index entry is computed to reference the new active level 1 and, at step 1345, the index entry is loaded into the active dense tree structure. At step 1350, a region key of a volume superblock is updated to reference the active dense tree structure and, at step 1355, the level 0 and level 1 of the merge dense tree structure are rendered inactive (alternatively, deleted). The procedure then ends at step 1360.

In an embodiment, as the dense tree fills up, the volume metadata is written out to one or more files on SSD in a sequential format, independent of when the volume layer log 345 is de-staged and written to SSD 260, i.e., logging operations may be independent of merge operations. When writing volume metadata from memory 220 to SSD, direct pointers to the data, e.g., in-core references to memory locations, may be replaced with pointers to an index block in the file that references a location where the metadata can be found. As the files are accumulated, they are illustratively merged together in a log-structured manner that continually writes the metadata sequentially to SSD. As a result, the lower level files grow and contain volume metadata that may be outdated because updates have occurred to the metadata, e.g., newer entries in the dense tree may overlay older entries, such as a hole entry overlaying an underlying data entry. The updates (i.e., layered LBA ranges) are "folded" into the lower levels, thereby overwriting the outdated metadata. The resulting dense tree structure thus includes newly written metadata and "holes" where outdated metadata has been deleted.

N-Way Merge Technique

Embodiments described herein are directed to an N-way merge (illustratively, three-way merge) technique for efficiently updating metadata in accordance with an N-way merge operation managed by the volume layer. As noted, the metadata is illustratively volume metadata embodied as mappings from LBAs of a LUN to durable extent keys maintained by the extent store layer. The volume metadata is illustratively organized as a multi-level dense tree metadata structure, wherein each level of the dense tree metadata structure (dense tree) includes volume metadata entries for storing the volume metadata. In an embodiment, the volume metadata (i.e., mappings) are organized such that a higher level of the dense tree contains more recent mappings than a next lower level, i.e., the level immediately below. A top (first) level of the dense tree stores the mappings as they are generated in response to I/O (e.g., write) requests processed by the storage I/O stack. When the first level becomes full, the mapping content of the first level is sorted by, e.g., ascending order of offset, and merged with the sorted mapping content of a next lower (second) level. In all merge operations, the content of a higher level takes precedence over the content of a lower level because the higher level includes more recent mappings. Similarly, when the second level fills, its content is merged with the sorted mapping content of a lowest (third) level. The N-way merge operation is an efficient (e.g., reduces write amplification) way of updating the volume metadata mappings of the dense tree by merging the mapping content of N (e.g., three) adjacent levels in a single iteration (i.e., single merge operation), as opposed to merging the content of the first level with the content of the second level in a first iteration using a two-way merge operation and then merging the result of the first iteration with the content of the third level in a second iteration of the operation and so on in a series of two-way merge operations until all N levels are merged. As such, the three-way merge technique may be employed as an N-way merge technique for dense trees having more than three levels wherein any number, N, of adjacent levels may be merged.

As noted above, the dense tree may be implemented as N levels, where N is three (or more) e.g., level 0 (L0), level 1 (L1), level 2 (L2), . . . level N (Ln). L0 stores the mappings (e.g., as volume metadata entries) as they are generated in response to I/O requests processed by the storage I/O stack. The mapping content of L0 is maintained in the in-core B+ tree for fast access during read operations. When L0 reaches its capacity, the content of L0 (as represented by the content in the in-core B+ tree) is organized as metadata pages and merged with the metadata pages of L1. Note that the first time L0 is ready to be merged, L1 is empty, thus, the content of the B+ tree is simply moved into L1 with no modifications. Subsequent merge operations from L0 to L1, however, may require the content of L1 to be read from SSD and merged with the content of L0. Merging of the content of L0 and L1 may involve processing of the mappings at each level to determine the offset (i.e., LBA) range overlap of the mappings. When L1 becomes full, the content of L1 may be either moved into an empty L2 or merged into an occupied (at least partially full) L2. Similarly, the technique may be extended to an N-way merge where a level Ln that becomes full is merged with a level Ln+1. That is, a plurality of adjacent levels may be "cascaded" into a single merge operation. Accordingly, a merge operation in the dense tree involves replacing older mappings in a lower level of the tree (i.e., higher level number) with newer mappings from a higher level (i.e., lower level number) such that the newer mapping may be removed from the higher level, thereby freeing occupied mapping capacity in the higher level.

Figure 14A:
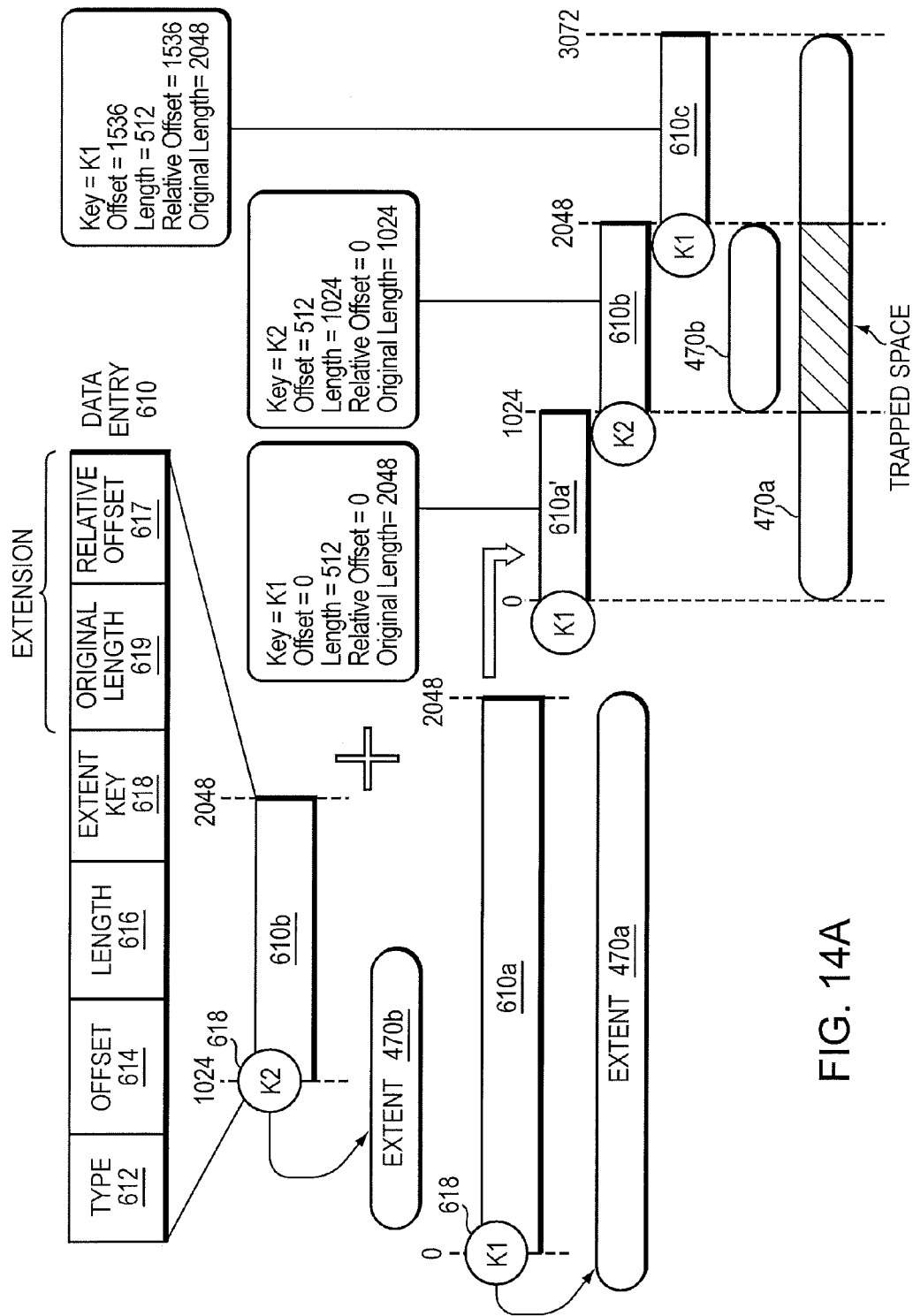
FIGS. 14a-c illustrate types of overlapping volume metadata entries between levels of the dense tree metadata structure: three-way split, back overlap, and front overlap.
Figure 14B:
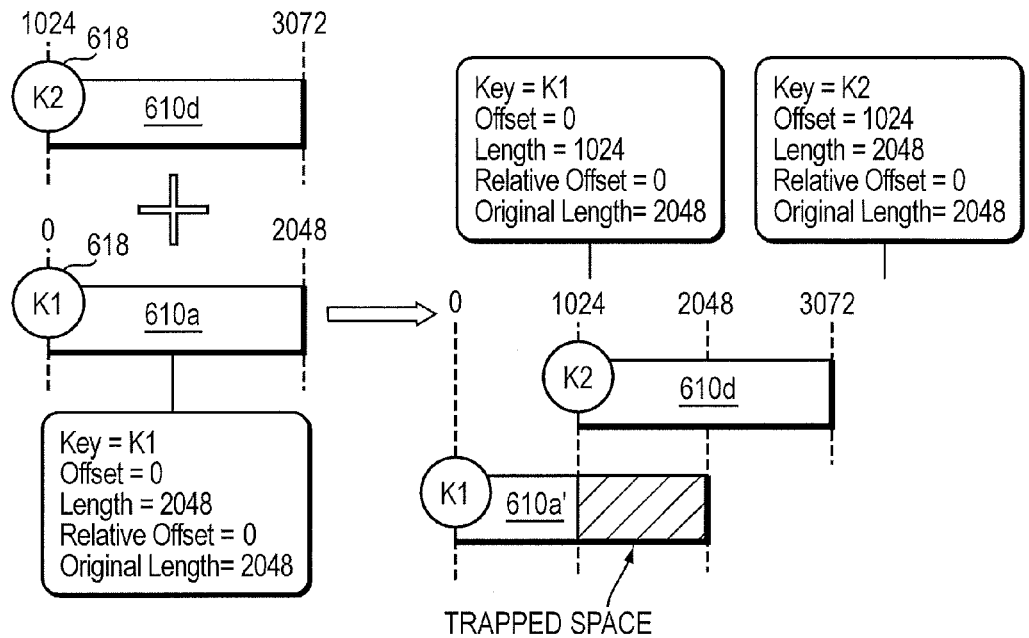
Figure 14C:
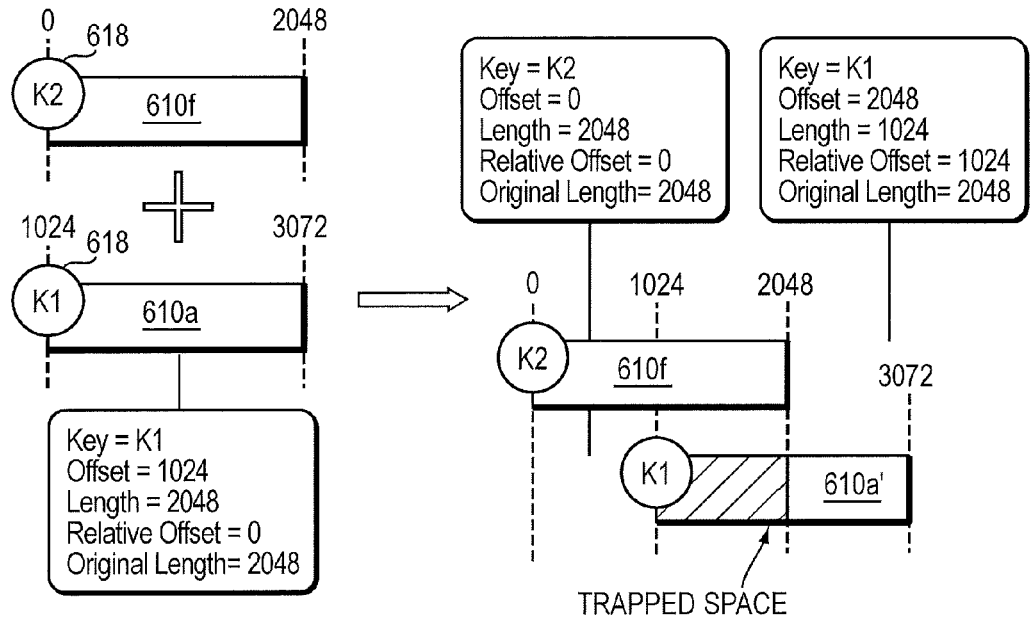

Processing of the overlapping mappings during the merge operation may manifest as partial overwrites of one or more existing extents. FIGS. 14*a*-*c* illustrate types of overlapping mappings (volume metadata entries) between levels of the dense tree metadata structure: three-way split, back overlap, and front overlap. Illustratively, a three-way split (FIG. 14*a*) of a first volume metadata entry 610*a* (having an extent key K1 associated with extent 470*a*) stored in L1 occurs when a second (later) volume metadata entry 610*b* (having an extent key K2 associated with second (later) extent 470*b*) is inserted into L0 such that an offset range (e.g., 1024-2048) of the second entry 610*b* is within the offset range (e.g., 0-3072) of first (earlier) entry 610*a* of L1. Accordingly, the first volume metadata entry 610*a* may be split during a merge operation into 610*a*' at the beginning (i.e., front) of the offset range (e.g., 0-1023) and volume data entry 610*c* at the end (i.e., back) of the offset range (e.g., 2049-3072) with the second metadata entry 610*b* (unchanged) occupying an intermediate portion of the offset range (e.g., 1024-2048) in between those of entries 610*a*' and 610*c*.

Illustratively, a back overlap (FIG. 14*b*) occurs when a later volume metadata entry 610*d* is inserted into L0 of the dense tree such that an offset range (e.g., 1024-3072) of the later entry overlaps a higher portion of the offset range (e.g., 0-2048) of an first (earlier) entry 610*a* in L1. During a merge operation, the length of the first entry 610*a* may be reduced (i.e., "shortened") by the amount of offset range overlap with the later entry 610*d* (e.g., length of 2048 reduced to 1024) to yield new volume metadata entries 610*a*', with offset (0-1023), and 610*d* (unchanged), i.e., with offset (1024-3072).

A front overlap (FIG. 14*c*) illustratively occurs when a later volume metadata entry 610*f* is inserted into the dense tree such that an offset range (e.g., 0-2048) of the later entry overlaps a lower portion of the offset range (e.g., 1024-3072) of the first (earlier) entry 610*a*. During a merge operation, the length of the first entry 610*a* may be reduced (i.e., "shortened") by the amount of offset range overlap with the later entry 610*f* (e.g., length of 2048 reduced to 1024) to yield a new volume metadata entry 610*a*', i.e., with offset (2048-3072), and 610*f* (unchanged), i.e., with offset (0-2048).

During the merge operation, metadata pages of the levels being merged are deleted and new metadata pages are created (e.g., even in the situation of a complete overwrite) resulting in replacement of a lower level metadata page with a merged metadata page. The dense tree merge operation is directed to merging mappings (i.e., entries) in a lower level of the dense tree with newer mappings from a higher level of the tree, so as to free space for new entries in the higher level of the tree. Each metadata page contains a plurality of (e.g., several to thousands) of these mappings (i.e., entries). Notably, existing metadata pages are not modified; rather one or more new metadata pages are created that contain the results (i.e., merged entries) of the merge.

According to the N-way merge technique, the metadata page contents of N (e.g., three) levels of the dense tree are merged in a single iteration of the three-way merge operation. In contrast, in order to merge N (e.g., three) levels using the previously described merge operation (a two-way merge), the metadata page contents of L1 and L1 are first merged in a first iteration (thus creating new pages from that iteration) and then those newly created pages are merged with metadata pages of L2 in a second iteration of the operation and so on in a series of two-way merge operations until all N levels are merged. For example, assume a three level dense tree (levels L0, L1, L2) in which L1 is nearly full as determined by, e.g., a next two-way merge operation after a current two-way merge operation (between L0 and L1) that causes L1 to fill (or overflow). Instead of generating new metadata pages from L0 to L1 during the current two-way merge operation and then realizing that the new metadata pages cannot be stored in L1 because it is full, the N-way merge technique preemptively determines that L1 is nearly full and merges all three levels in a single iteration to essentially "push" the metadata page contents (i.e., entries of L0 and L1) to L2 which frees up L0 and L1. This reduces the time consumed by the two-way merge operation, as well as reduces write amplification, because entries created by the current merge operation (L0 and L1) and re-merged in the next merge operation (L1 and L2) are avoided.

In an embodiment, an N-way merge operation may be triggered when a lower level (e.g., L1) is approximately 80-90% full (i.e., nearly full); otherwise the merge operation invoked by the volume layer is illustratively a two-way merge operation between the high and lower levels (e.g., L0 and L1). Triggering of the N-way merge operation when the lower level is nearly full is desirable to avoid a situation where, if there is sufficient storage space in the lower level (e.g., L1) to store the metadata page contents of a merge between L0 and L1, metadata pages of L2 would have to be rewritten needlessly, thereby resulting in write amplification. In an alternative embodiment, the N-way merge technique may be invoked when there is too much storage space trapped by overlapping entries in lower levels of the dense tree such that merging of entries frees space for new entries.

Illustratively, the N-way merge technique ensures that a result set of the N-way merge operation contains the most recent mappings of offset to key (i.e., extents). For example, if L0 has a mapping that overlaps with older mappings L1 and L2, then L0's mapping takes precedence because it is the most recent mapping and the older overlap mappings of L1 and L2 are deleted (i.e., merged with the most recent mapping of L0 and replaced). If L0 does not have a mapping for a particular offset range, but L1's mapping overlaps with L2's mapping, then L1's mapping takes precedence (i.e., more recent than the overlapped L2 mapping) and is reflected in the result set (i.e., merged entries). If L0 and L1 do not have a mapping for a particular offset range, but L2 has such a mapping, then L2's mapping takes precedence (i.e., the sole mapping on the dense tree for the particular offset range) and is reflected in the results set.

In order to merge N levels in a single iteration, the N-way merge technique may employ a sliding window (i.e., an offset length) that advances across an offset range space of the dense tree (region) and fills the window with mappings from the levels. A mapping found in a higher level takes precedence over a mapping in a lower level. In an embodiment, the N-way merge technique organizes the offset range space of the dense tree as a grid or "matrix" having a top-down focus (e.g., L0 at the top and L2 at the bottom) and advances the sliding window from a starting offset (i.e., a beginning) of the matrix to an ending offset (i.e., an end) of the matrix. According to an N-way merge algorithm of the technique, the sliding window advances at defined offset and length intervals such that, at each interval, the mapping contents of the levels that fill the window are examined. For example, assume a three-way merge (i.e., N=3) where the sliding window begins at a first offset and length interval, e.g., [offset=0, length=max]. If a mapping of L0 is present at the interval, that mapping is loaded into the result set. If there is a gap at L0 for the offset and length interval but L1 has a mapping, L1's mapping is loaded into the result set. If both L0 and L1 have gaps for the particular offset and length interval but L2 has a mapping at that interval, then L2's mapping is loaded into the result set. The sliding window then advances to a second offset and length interval, e.g., [offset=1000, length=max], and the mapping contents of the levels that fill the window are examined with appropriate higher level mappings taking precedence and being loaded into the result set. The algorithm continues by advancing the sliding window to subsequent intervals and examining mappings that fill the window, until the end of the matrix is reached.

Figure 15:
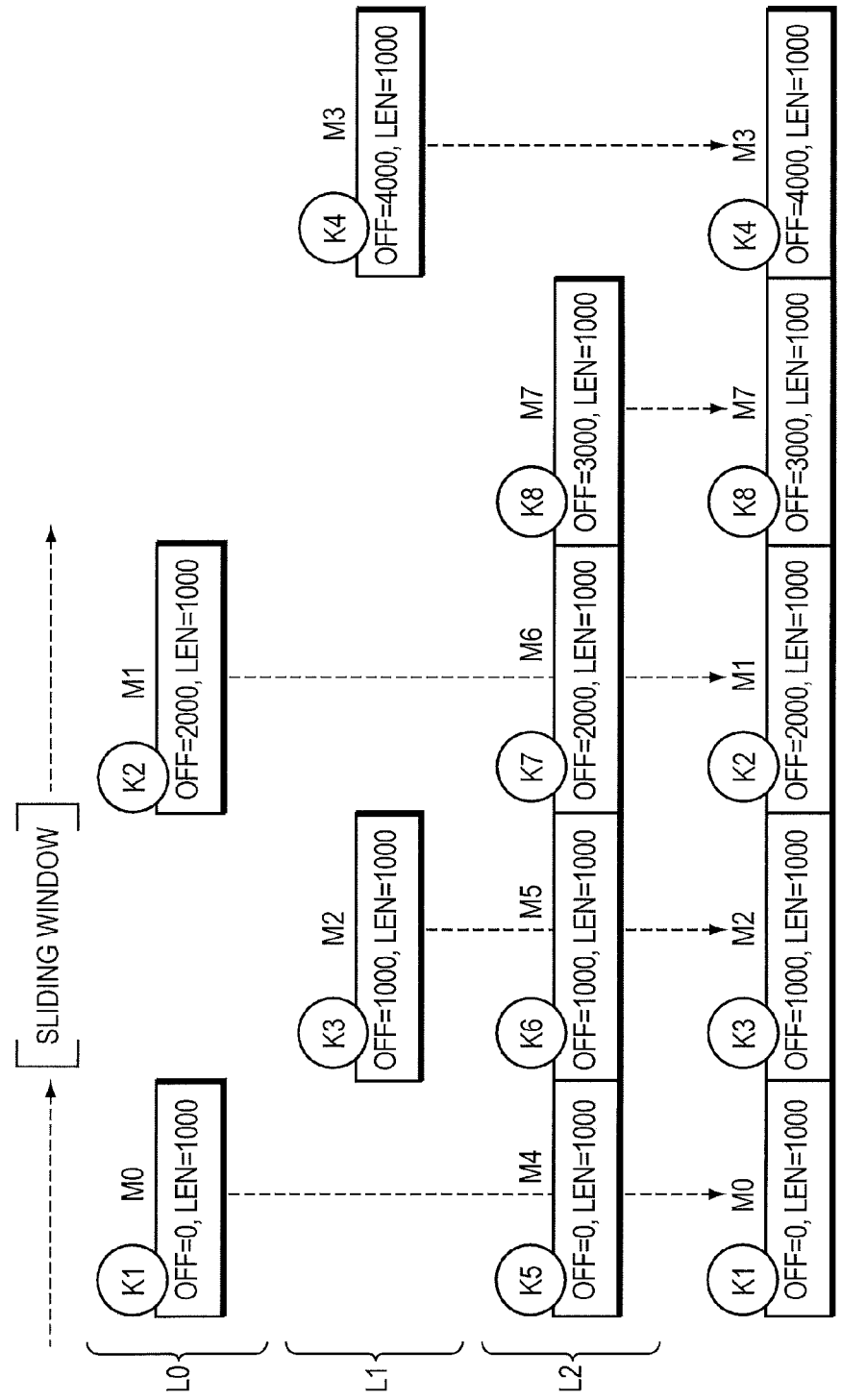
FIG. 15 illustrates an exemplary three-way merge technique for efficiently updating volume metadata entries of the levels of the dense tree metadata structure.

FIG. 15 illustrates an exemplary three-way merge technique for efficiently updating volume metadata entries (i.e., mappings) of the levels of the dense tree. For purposes of depiction and ease of understanding, the example three-way merge technique illustrates operation of the algorithm for a situation where there is a complete (i.e., full) overlap of each mapping between levels of the dense tree. However, the three-way merge algorithm may also operate with front, back and three-way split overlap of mappings between levels of the dense tree as described above. In an embodiment, a top level (e.g., L0) of the matrix contains mappings M0=[offset=0, length=1000, key=K1] and M1=[offset=2000, length=1000, key=K2], whereas a lower level (e.g., L1) of the matrix contains mappings M2=[offset=1000, length=1000, key=K3] and M3=[offset=4000, length=1000, key=K4]. The lowest level (e.g., L2) of the matrix contains mappings M4=[offset=0, length=1000, key=K5], M5=[offset=1000, length=1000, key=K6], M6=[offset=2000, length=1000, key=K7], and M7=[offset=3000, length=1000, key=K8]. Note that values ascribed to the offset and length mappings are illustratively relative to the beginning of the offset range of the dense tree.

Operationally, the sliding window begins at first offset and length interval, e.g., W=[offset=0, length=max], and L0 is examined to determine whether it has any mapping that fills the window. Illustratively, a first mapping in L0, e.g., M0=[offset=0, length=1000, key=K1], has offset and length parameters that fall within the interval of the sliding window W. Accordingly, the mapping M0 takes precedence over any mappings in any of the other levels of the dense tree and, thus, is included in the result set, e.g., R=[M0]. The sliding window then advances to a next offset and length interval, e.g., W=[offset=1000, length=max]. Examination of L0 reveals that there is no mapping to fill the window, so the next lower level, e.g., L1, is examined. A first mapping in L1, e.g., M2=[offset=1000, length=2000, key=K3], has offset and length parameters that fall within the interval of the sliding window W. Therefore, the mapping M2 takes precedence over any mapping in the lowest level of the dense tree and is included in the result set, e.g., R=[M0, M2]. The sliding window then advances to the next offset and length interval, e.g., W=[offset=2000, length=max], where a mapping in L0, e.g., M1=[offset=2000, length=1000, key=K2], fills the window and, thus, takes precedence over other mappings, e.g., M6 in L2, of the dense tree levels such that it is included in the result set, e.g., R=[M0, M2, M1].

The sliding window then advances to the next offset and length interval, e.g., W=[offset=3000, length=max], where examination of levels L0 and L1 reveal that there are no mappings to fill the window. Accordingly, the next lower level, e.g., L2, is examined to reveal a mapping, e.g., M7=[offset=3000, length=1000, key=K8], that fills the window and is included in the result set, e.g., R=[M0, M2, M1, M7]. The sliding window then advances to the next offset and length interval, e.g., W=[offset=4000, length=max], where there is no mapping in L0 that fills the window. However, L1 contains a mapping, e.g., M3=[offset=4000, length=1000, key=K4], with offset and length parameters that fall within the interval of the window. As such, the mapping M3 is included in the result set, e.g., R=[M0, M2, M1, M7, M3]. The sliding window then advances to the next offset and length interval, e.g., W=[offset=5000, length=max], which is not included in the matrix. Therefore the algorithm ends, resulting in the merge result set of R={M0, M2, M1, M7, M3}. The metadata mappings (embodied as metadata pages) corresponding to the result set are stored in L2, and L0 and L1 are cleared. In addition, all mappings from L1 and L2 that are not part of the result set are discarded.

Advantageously, the N-way merge technique described herein reduces the number of merge operations in the storage I/O stack by proactively merging all three levels of the dense tree in a single iteration when the levels are nearly full, as opposed to merging two levels and realizing that merge resulted in a full level and thereafter performing another iteration of the two-way merge operation. As for the latter, new metadata pages created as result of the first iteration of the two-way merge operation between a high level and the lower level (e.g., L0 and L1) may be written to the extent store only to realize that lower level (e.g., L1) is full and does not have the capacity to store those new pages. Accordingly, another two-way merge operation (i.e., a second iteration) between the lower level and a next lower level (e.g., L1 and L2) is required to store the new pages. Notably, the first and second iterations of the merge operations require that the metadata pages be scanned twice, i.e., once for the merge between pages stored on L0 and L1 that resulted in newly created metadata pages, and once for the merge between the newly created metadata pages and the pages stored in L2. The N-way merge technique obviates such multi-merge iterations and their associated write amplification. As a result, the N-way merge technique enables the storage I/O stack system to maintain consistent latency of operations while reducing write amplification due to the avoidance of unnecessary write operations to the storage array.

While there have been shown and described illustrative embodiments directed to a three-way merge technique for efficiently updating metadata in accordance with a three-way merge operation managed by the volume layer of the storage I/O stack executing on one or more nodes of a cluster, it is to be understood that various other adaptations and modifications may be made within the spirit and scope of the embodiments herein. For example, embodiments have been shown and described herein with relation to an algorithm of the technique configured to receive three inputs, one for each level of the dense tree (e.g., L0, L1 and L2), such that the merge operation may operate on the mapping contents of all three levels. However, the embodiments in their broader sense are not so limited, and may, in fact, also allow for use of the algorithm configured to receive only two inputs (e.g., L0 and L1) such that the merge operation may operate, e.g., as a two-way merge operation, on the mapping contents of only those two levels. In other words, the algorithm for the three-way merge may be employed for a two-way merge. As such, the three-way merge technique may be employed as an N-way merge technique for dense trees having more than three levels (i.e., N levels) wherein any number, N, of adjacent levels may be merged.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software encoded on a tangible (non-transitory) computer-readable medium (e.g., disks and/or CDs) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method comprising:
receiving first, second and third write requests directed towards a logical unit (LUN), the first, second and third write requests having respective first, second and third data, the first, second and third write requests representing respective first, second and third offset ranges of the LUN, the second and third offset ranges overlapping the first offset range, the write requests processed at a storage system having a memory;
associating first, second and third keys with the respective first, second and third data;
storing the first, second and third keys in respective first, second and third entries of a metadata structure;
merging the first, second and third entries to form a fourth entry, the fourth entry representing a merge of the first, second and third offset ranges, the second and third entries stored on an array of storage devices attached to the storage system; and
storing the fourth entry on the storage array.

2. The method of claim 1 wherein the metadata structure includes a plurality of levels, and wherein the first, second and third entries are each associated with a different level.

3. The method of claim 2 wherein a first level of the plurality of levels is associated with the first entry, wherein a second level of the plurality of levels is associated with the second entry, wherein a third level of the plurality of levels is associated with the third entry, wherein the first entry is more recent than the second entry, and wherein the second entry is more recent than the third entry.

4. The method of claim 3 wherein the fourth entry has an offset range that includes a portion of the first offset range that overlaps the second and third offset ranges.

5. The method of claim 2 wherein the plurality of levels form a dense tree structure.

6. The method of claim 3 wherein merging the first, second and third entries to form the fourth entry occurs when a first level of the plurality of levels exceeds a capacity threshold.

7. The method of claim 3 wherein the first level of the plurality of levels is emptied.

8. The method of claim 7 wherein the second level of the plurality of levels is emptied.

9. The method of claim 1 wherein the storage devices are solid state drives.

10. A method comprising:
receiving a number of write requests directed towards a logical unit (LUN),each write request having respective data and representing respective offset ranges of the LUN, wherein the number of write requests is greater than three, the write requests processed at a storage system having a memory;
associating the respective data of each write request with a respective key;
storing the respective key of the respective data in a respective entry of a metadata structure, wherein the metadata structure includes a plurality of levels, wherein each entry is associated with a different level of the plurality of levels;
merging the respective entries to form a merged entry, the merged entry representing a merge of all the respective offset ranges, the plurality of entries stored on an array of storage devices attached to the storage system; and
storing the merged entry on a lowest level of the plurality of levels of the metadata structure.

11. A system comprising:
a storage system having a memory connected to a processor via a bus;
a storage array coupled to the storage system; and
a storage I/O stack executing on the processor of the storage system, the storage I/O configured to:
receive first, second and third write requests directed towards a logical unit (LUN), the first, second and third write requests having respective first, second and third data, the first, second and third write requests representing respective first, second and third offset ranges of the LUN, the second and third offset ranges overlapping the first offset range, the write requests processed at a storage system having a memory;
associate first, second and third keys with the respective first, second and third data;
store the first, second and third keys in respective first, second and third entries of a metadata structure;
merge the first, second and third entries to form a fourth entry, the fourth entry representing a merge of the first, second and third offset ranges, the second and third entries stored on an array of storage devices attached to the storage system; and
store the fourth entry on the storage array.

12. The system of claim 11 wherein the metadata structure includes a plurality of levels, and wherein the first, second and third entries are each associated with a different level.

13. The system of claim 12 wherein a first level of the plurality of levels is associated with the first entry, wherein a second level of the plurality of levels is associated with the second entry, wherein a third level of the plurality of levels is associated with the third entry, wherein the first entry is more recent than the second entry, and wherein the second entry is more recent than the third entry.

14. The system of claim 13 wherein the fourth entry has an offset range that includes a portion of the first offset range that overlaps the second and third offset ranges.

15. The system of claim 12 wherein the plurality of levels form a dense tree structure.

16. The system of claim 13 wherein the merge of the first, second and third entries to form the fourth entry occurs when a first level of the plurality of levels exceeds a capacity threshold.

17. The system of claim 13 wherein the first level of the plurality of levels is emptied.

18. The system of claim 17 wherein the second level of the plurality of levels is emptied.

19. The system of claim 11 wherein the storage devices are solid state drives.

20. The system of claim 13 wherein the fourth entry is stored on the third level of the plurality of levels of the metadata structure.

* * * * *

UNITED STATES PATENT AND TRADEMARK OFFICE
CERTIFICATE OF CORRECTION

PATENT NO. : 9,836,229 B2
APPLICATION NO. : 14/546214
DATED : December 5, 2017
INVENTOR(S) : Janice D'Sa et al.

It is certified that error appears in the above-identified patent and that said Letters Patent is hereby corrected as shown below:

In the Specification

Column 14, Line 9:
DELETE "tion, the leaves 30 of the B+ tree may be stored in a page"
INSERT --tion, the leaves 830 of the B+ tree may be stored in a page--

Column 19, Line 10:
DELETE "merge), the metadata page contents of L1 and L1 are first"
INSERT --merge), the metadata page contents of L0 and L1 are first--

In the Claims

Claim 11, Column 23, Line 30:
DELETE "storage system, the storage I/O configured to:"
INSERT --storage system, the storage I/O stack configured to:--

Signed and Sealed this
Thirty-first Day of December, 2019

Andrei Iancu
*Director of the United States Patent and Trademark Office*